(12) United States Patent
Licking et al.

(10) Patent No.: US 10,050,854 B1
(45) Date of Patent: Aug. 14, 2018

(54) PACKET GENERATION-BASED BIDIRECTIONAL FORWARDING DETECTION

(71) Applicant: Barefoot Networks, Inc., Palo Alto, CA (US)

(72) Inventors: Steven Licking, San Jose, CA (US); Chaitanya Kodeboyina, Los Altos, CA (US); Julianne Zhu, Los Gatos, CA (US); Changhoon Kim, Palo Alto, CA (US)

(73) Assignee: BAREFOOT NETWORKS, INC., Santa Clara, CA (US)

( * ) Notice: Subject to any disclaimer, the term of this patent is extended or adjusted under 35 U.S.C. 154(b) by 121 days.

(21) Appl. No.: 15/261,941

(22) Filed: Sep. 10, 2016

Related U.S. Application Data

(60) Provisional application No. 62/292,517, filed on Feb. 8, 2016.

(51) Int. Cl.
  *H04L 12/26* (2006.01)
  *H04L 12/935* (2013.01)
  *H04L 12/743* (2013.01)

(52) U.S. Cl.
  CPC ............ *H04L 43/08* (2013.01); *H04L 43/16* (2013.01); *H04L 45/7453* (2013.01); *H04L 49/3063* (2013.01)

(58) Field of Classification Search
  CPC ..... H04L 43/08; H04L 43/0811; H04L 43/10; H04L 43/16; H04L 45/22; H04L 47/12; H04L 49/3063

USPC ................... 370/241.1, 242, 248, 249, 250
  See application file for complete search history.

(56) References Cited

U.S. PATENT DOCUMENTS

| | | | |
|---|---|---|---|
| 8,139,479 B1 * | 3/2012 | Raszuk | H04L 43/0811 370/241.1 |
| 9,258,234 B1 * | 2/2016 | Addepalli | H04L 47/12 |
| 9,385,886 B2 | 7/2016 | Lin | |
| 9,497,107 B1 * | 11/2016 | Akiya | H04L 45/22 |
| 2004/0131079 A1 | 7/2004 | Hedge et al. | |
| 2013/0003556 A1 | 1/2013 | Boden et al. | |
| 2013/0132536 A1 | 5/2013 | Zhang et al. | |
| 2014/0301203 A1 | 10/2014 | Kampmann et al. | |
| 2016/0142340 A1 | 5/2016 | Zhou | |
| 2016/0285762 A1 | 9/2016 | Chen et al. | |

* cited by examiner

*Primary Examiner* — Harun Chowdhury
(74) *Attorney, Agent, or Firm* — Adeli LLP

(57) ABSTRACT

A method of performing bidirectional forwarding detection (BFD) by a hardware forwarding element that includes a set of ingress pipelines and a set of egress pipelines. Each ingress pipeline includes a packet generator. A packet generator in a first pipeline periodically generates a pair of packets to monitor the health of a particular egress link. The pair includes a BFD transmit packet and a BFD dummy transmit packet. The method forwards each dummy BFD transmit packet to a first egress pipeline and increments a counter at the first egress pipeline. Each BFD packet is transmitted through the particular egress link to a network node. BFD packets received from the network node are forwarded to the first egress pipeline and the value of the counter is rest. The method marks the particular egress link as failed when the value of the counter exceeds a predetermined threshold.

10 Claims, 17 Drawing Sheets

PACKET GENERATION-BASED BIDIRECTIONAL FORWARDING DETECTION

CLAIM OF BENEFIT TO PRIOR APPLICATIONS

The present Application claims the benefit of U.S. Provisional Application 62/292,517, entitled "Packet Generation in the Data Plane of a Forwarding Element," filed Feb. 8, 2016. The content of U.S. Provisional Application 62/292,517 is hereby incorporated by reference.

BACKGROUND

Software defined networks (SDNs) decouple the data and control planes. The data plane, which is also referred to as forwarding plane or user plane, is the part of the network that carries data packets (i.e., user packets) traffic. In contrast, the control plane in a network controls signaling traffic and routing.

In a forwarding element (e.g., a hardware switch or a hardware router), the data plane is the part of the architecture that decides what to do with the packets that arrive at the ingress interface. The data plane of a forwarding element is implemented by hardware and firmware while the control plane is implemented in software to provide for a more flexible management of network components from a central location.

Performing operations by the software in the control plane could, however, be time consuming and slow. For instance, marking failed ports, marking failed paths, or performing bidirectional forwarding detection for monitoring links between two forwarding elements can place a heavy burden on the processor and slow down the operations of the forwarding elements.

BRIEF SUMMARY

Some embodiments provide a hardware forwarding element with a novel packet generator that generates packets inside the forwarding element by performing a set of hardware and firmware operations in the data plane. The hardware forwarding element of some embodiments includes, among other elements, an ingress pipeline and an egress pipeline. Each of these pipelines includes a parser, a match-action unit (MAU), and a deparser. The generated packets cause different operations to be performed in the data plane by the match-action stages of the MAU.

The packet generator generates a set of packets in response to a triggering event. Examples of a triggering event include as port liveness signal that indicates an egress port of the forwarding element has failed, the receipt of a recirculation packet that is recirculated from an egress pipeline of the forwarding element, the expiration of a one-time timer, the expiration of a periodic timer, etc.

The packet generator in some embodiments generates different types of packets (i.e., packets that carry different information) for different triggering events. The packet generator uses one or more of a set of applications to generate packets for each triggering event. Each application is programmed to generate packets for one of the triggering events. The packet generator has a state machine. Each application that is selected to run, uses the state machine for generating the packets. Each application has a configuration set and uses a packet payload template. The packet payload template is used to identify different field of the packets that are generated for a triggering event.

The configuration set identifies, e.g., what template to use to generate the packet, how many batches of packets to generate, how many packets are in each batch, what are the inter packet and inter batch gaps and jitters, etc. The configuration set can also specify a spoofed source port in order to give the MAU the impression that the generated packet came from a specific ingress port rather than a fixed packet generator port. This spoofed source port can also optionally increment with each packet in a batch so as to give the MAU the impression that these packets are coming from every ingress port.

Each triggering event requires a set of actions to be performed. These actions are performed when the generated packets cause different operations to be performed in the data plane of the forwarding element by the match-action stages of the MAU. For instance, a triggering event that identifies that a port has failed may require that a status bit corresponding to the failed port to be set to 0. As another example, when the triggering event is the receipt of a recirculation packet from an egress pipeline of the forwarding element, the required action is one or more of table updates caused by the generated packets in the match-action stages of the MAU (e.g., to remove) a next hop from an equal-cost multi-path (ECMP) group of next hops.

In some embodiments, the forwarding element includes a set of match-action stages. Each of these stages matches a particular set of header fields of a packet against a match table and takes an action based on the result of the match (e.g., assigns the packet to an output port and queue, drops the packet, modifies one or more of the packet header fields, etc.).

The packet generator sets the values of one or more fields in each generated packet to match the matching criteria of a group of one or more match-action stages of the forwarding element. For instance, the process places the identification of a failed port in a particular field of the packets header.

When the packet generator places the generated packets in one of the ingress pipeline of the forwarding element, a parser in the ingress pipeline parses the packets and places the fields that are used to match different match-action criteria in predetermined registers (or container) of the packer header vector (PHV).

The PHV fields are matched with the match field of the particular match-action stages that are preprogrammed to match the PHV fields. For instance, the identification of a failed port is matched with the matching criteria of a match-action stage. Once a PHV field is matched by a match-action stage, the corresponding action that is preprogrammed to perform the operations required by the triggering event performs these operations. For instance, the action may calculate a pointer to the location of the status bit of a failed port and set the status bit to 0.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Software defined networks (SDNs) decouple the data and control planes. The data plane, which is also referred to as forwarding plane or user plane, is the part of the network that carries data packets (i.e., user packets) traffic. In contrast, the control plane in a network controls signaling traffic and routing.

In a forwarding element (e.g., a hardware switch or a hardware router), the data plane is the part of the architecture that decides what to do with the packets that arrive at the ingress interface. The data plane of a forwarding element is implemented by hardware and firmware while the control plane is implemented in software to provide for a more flexible management of network components from a central location. Performing operations by the software in the control plane could, however, be time consuming and slow.

I. Generating Packets in the Data Plane of a Forwarding Element

Some embodiments provide a hardware forwarding element with a novel packet generator that generates packets inside the forwarding element by performing a set of hardware and firmware operations in the data plane. The hardware forwarding element of some embodiments includes, among other elements, an ingress pipeline and an egress pipeline. Each of these pipelines includes a parser, a match-action unit (MAU), and a deparser. The generated packets cause different operations to be performed in the data plane by the match-action stages of the MAU.

A. The Forwarding Element

Figure 1:
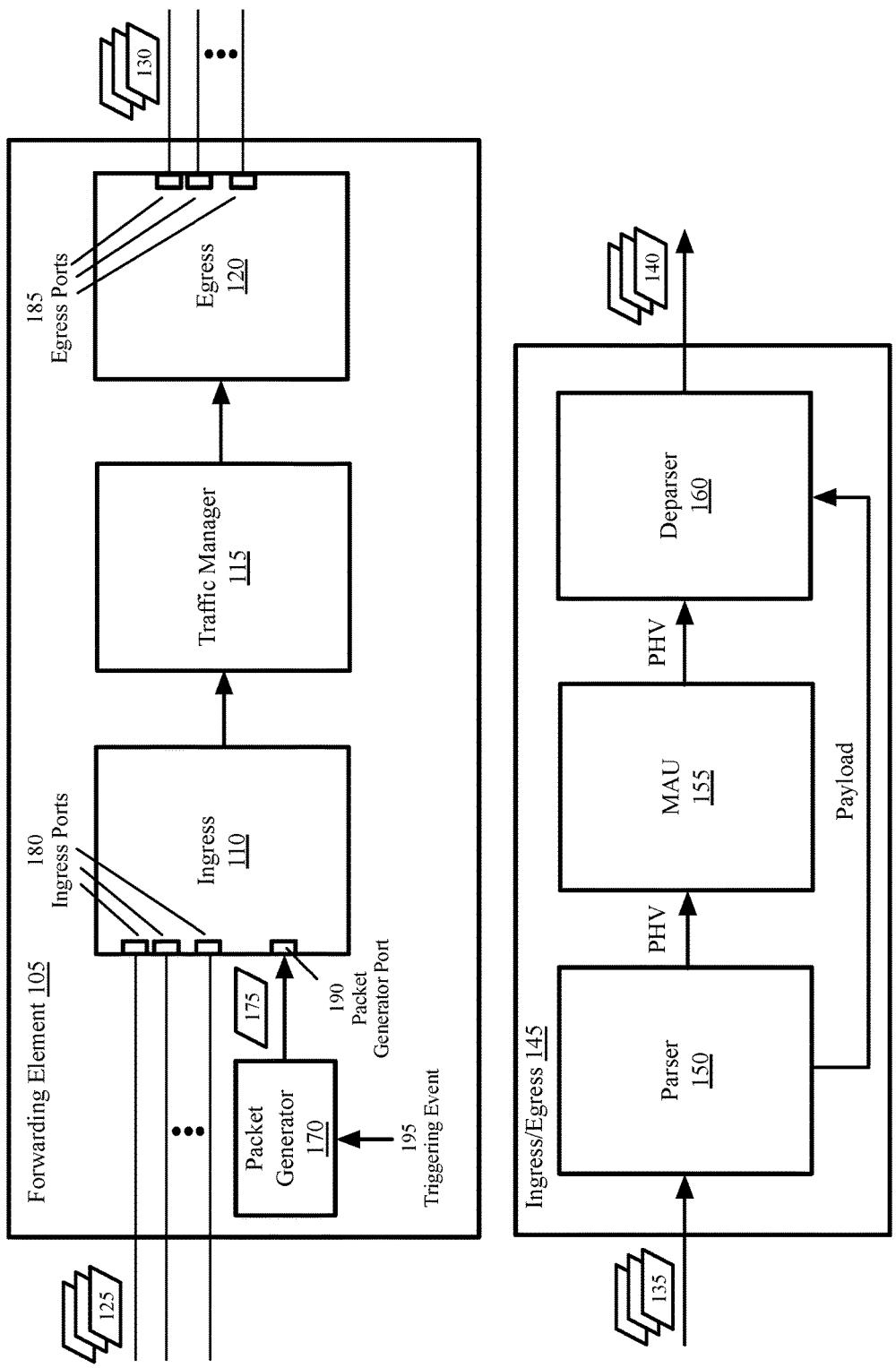
FIG. 1 conceptually illustrates a block diagram of a hardware forwarding element that includes a packet generator in some embodiments.

FIG. 1 conceptually illustrates a block diagram of a hardware forwarding element that includes a packet generator in some embodiments. As shown, the forwarding element 105 includes an ingress pipeline 110, a traffic manager 115, an egress pipeline 120, and a packet generator 170. The packet generator is capable of generating packets internally in the forwarding element and sending the packets through the packet pipeline.

The traffic manager 115 in some embodiments has several components such as a queuing and buffering system, a packet replicator, and a port failure feedback generator. These components are described further below. In some embodiments, the traffic manager 115 receives the packets that are processed by the ingress pipeline and provides a large shared buffer (storage) that accommodates the queuing delays due to oversubscription of the output channels of the ingress deparser. In some embodiments, the data buffer stores packet data, while pointers to that data are kept in different queues per channel. Each channel in turn requests data from the common data buffer using a configurable queuing policy. When pointers to packets reach the head of the queues, the packets are read out of the data buffer of the traffic manager 115 into the egress pipeline 120.

As shown, the ingress packets 125 are received at the ingress pipeline 110 through a set of ingress ports 180 while packets 175 that are generated by the packet generator are received at the ingress pipeline at a separate port 190. The packet generator 170 receives a triggering event 195 that is used by the packet generator to determine what type of packet or packets to generate. For instance, as described below, the triggering event in some embodiments includes receiving a signal that indicates the expiration of a one time timer, receiving a signal that indicates the expiration of a periodic timer, receiving a packet that is recirculated from the egress pipeline of the forwarding element to the ingress pipeline of the forwarding element, receiving a signal that indicates an egress port has failed, etc.

The packet generator uses the triggering event to select one or more of several configuration sets. The selected configuration sets identify, e.g., what template to use to generate the packet, how many batches of packets to generate, how many packets are in each batch, what are the inter packet and inter batch gaps and jitters, etc. For instance, when a forwarding element's port fails, some embodiments generate an interrupt that provides the identification of the failed port. The interrupt is used to provide the identification of the failed port to the packet generator, which in turn is used to select a corresponding configuration set to generate a packet that causes a match action in the ingress pipeline to mark the port as failed.

The configuration set can also specify a spoofed source port in order to give the MAU the impression that the generated packet came from a specific ingress port rather than a fixed packet generator port. This spoofed source port can also optionally increment with each packet in a batch so as to give the MAU the impression that these packets are coming from every ingress port.

FIG. 1 also shows a block diagram 145 of an interface of the hardware forwarding element 105. Each one of the ingress 110 and egress 120 pipelines uses an interface similar to the interface 145. The interface includes a pipeline with three different units, namely a parser unit 150, an MAU 155, and a deparser unit 160. The parser 150 of some embodiments receives the incoming packets and produces a packet header vector (PHV) as its output. In other words, the parser 150 separates the packet headers from the packet payload by extracting different fields of packet headers and storing them in the PHV.

In some embodiments the PHV includes a set of different size registers or containers. For instance, in some embodiments the PHV includes sixty-four 8-bit registers, ninety-six 16-bit registers, and sixty-four 32-bit registers (for a total of 224 registers containing 4096 bits). Other embodiments may have any different numbers of registers of different sizes. In some embodiments, the parser 150 stores each extracted packet header in a particular subset of one or more registers of the PHV. For example, the parser might store a first header field in one 16-bit register and a second header field in a combination of an 8-bit register and a 32-bit register (e.g., if the header field is 36 bits long).

The PHV provides the input data to the match tables of the MAU. In some embodiments the MAU 155 includes a set of match-action stages (e.g., 32 match-action stages). Each of these stages matches a particular set of header fields against a match table and takes an action based on the result of the match (e.g., assigning the packet to an output port and queue, dropping the packet, modifying one or more of the header fields, etc.). Based on the actions taken on different header data during the different stages of the MAU 155, the PHV that the MAU outputs might include the same header data as the PHV that the MAU received from the parser, or the output PHV might contain different data than the input PHV.

The output PHV is then handed to the deparser 160. The deparser 160 reassembles the packet by putting back together the output PHV (that might or might not have been modified) that the deparser receives from the MAU 155 and the payload of the packet that the deparser receives directly from the parser 150.

The deparser then sends the packets 140 out of the ingress/egress pipeline (to the traffic manager 115 or out of the forwarding element, depending on whether it is the deparser for the ingress pipeline or the egress pipeline). An output packet 130 may be the same packet as the corresponding input packet 125 (i.e., with identical packet headers), or it may have different packet headers compared to the input packet based on the actions that are applied to the packet headers in the ingress and egress pipelines (e.g., different header field values for certain header fields and/or different sets of header fields).

It should be understood that the illustrated blocks in forwarding element 105 are exemplary only. The ingress, traffic manager, and egress blocks are simplified for ease of description. For example, although the figure shows only one entry point to the ingress parser and one exit point from the egress deparser, in some embodiments the input signals are received by many different input channels (e.g., 64 channels) and the output signals are sent out of the forwarding element from different output channels (e.g., 64 channels). Additionally, although for the illustrated forwarding element only one parser interface is shown for the ingress/egress pipeline 145, some embodiments employ numerous parser blocks (e.g., 16 parser blocks) that feed a match-action unit (MAU) in each pipeline.

Figure 2:
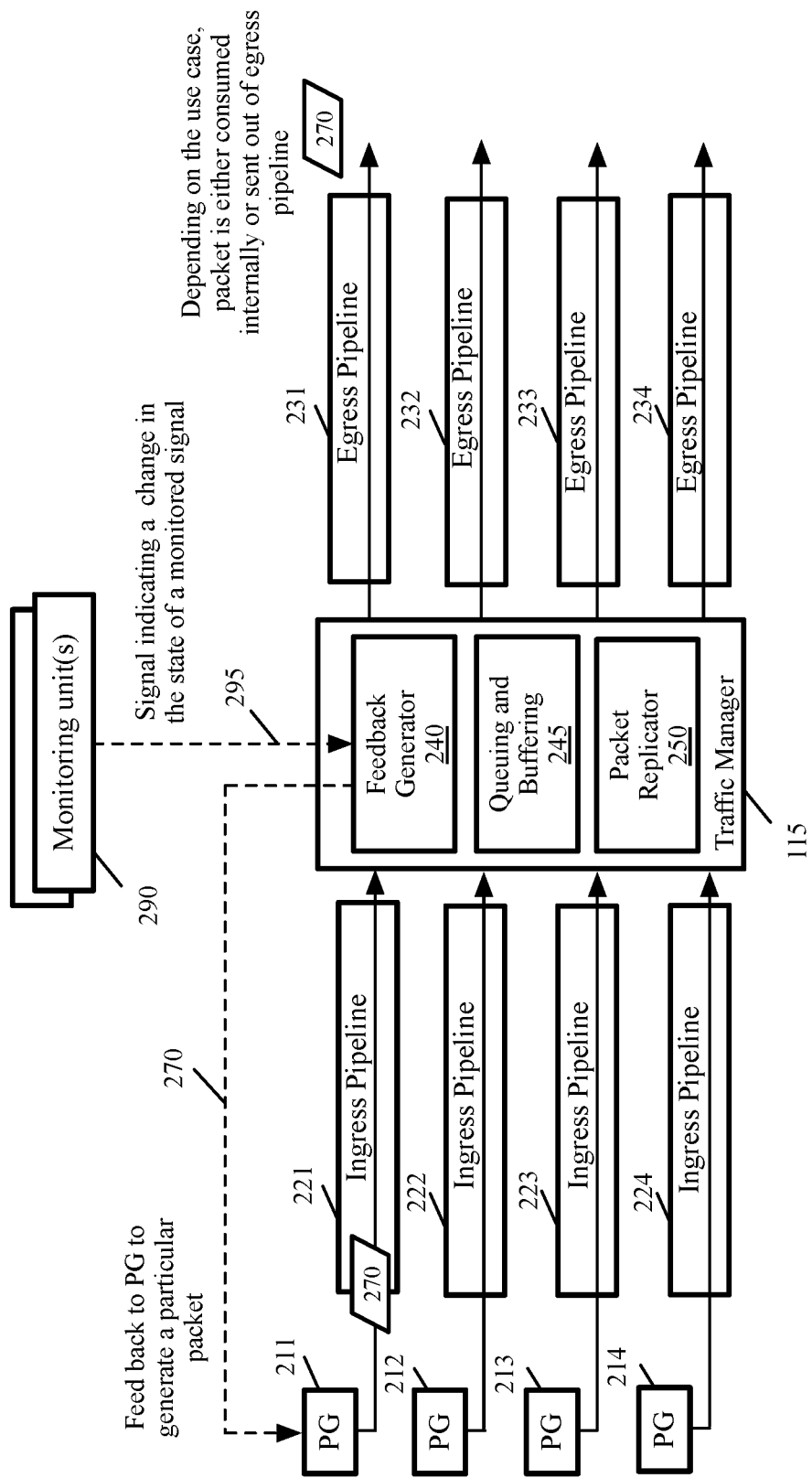
FIG. 2 conceptually illustrates further details of a hardware forwarding element that includes several ingress and egress pipelines in some embodiments.

FIG. 2 conceptually illustrates further details of a hardware forwarding element that includes several ingress and egress pipelines in some embodiments. The figure shows traffic manager 115, several ingress pipelines 221-224 (each pipeline is similar to ingress pipeline 110 in FIG. 1), several egress pipelines 231-234 (each pipeline is similar to egress pipeline 120 in FIG. 1), and several packet generators 211-214 (each packet generator is similar to packet generator 170 in FIG. 5). Each packet generator 211-214 is associated with one ingress pipeline 221-224. For instance, packet generator 211 is associated with ingress pipeline 221.

The figure also shows several monitoring units 290 that monitor different entities in the data plane and generate signals 295 upon the occurrence of a monitored event. For instance, the monitoring units 290 in some embodiments include a set of media access control (MAC) units that monitor ingress and egress ports. In some embodiments, one MAC unit is utilized for monitoring both the ingress and the egress ports of a pipeline. Upon the failure of a monitored port, the corresponding MAC unit (i.e., the corresponding monitoring unit 290) generates an interrupt.

As shown, traffic manager 115 has several components: a queuing and buffering system 245, a packet replicator 250, and a feedback generator 240. As described above, the queuing and buffering system provides a large shared buffer that accommodates the queuing delays due to oversubscription of the output channels of the ingress deparser. The feedback generator 240 receives a hardware signal from a monitoring unit (e.g., a MAC unit) that detects the occurrence of a monitored event (e.g., a port failure).

Once the feedback generator 240 receives the signal 295, the feedback generator 240 in turn generates a hardware signal (as conceptually shown by arrow 270) to one of the packet generators. For instance, if the signal 295 is generated by a monitoring unit 290 after a port failure, the feedback generator sends the hardware signal 270 to the packet generator 211 that is connected to the ingress pipeline 221 and egress pipeline 231 that are associated with the failed port. The hardware signal includes the identification of the entity or the event being monitored (e.g., the identification of the failed port). For instance the feedback generator in some embodiments identifies the failed port based on which monitoring unit has reported the failure. In other embodiments, the signal from a monitoring unit (e.g., a MAC unit that monitors several ports) to the feedback generator includes the identification of the failed port (e.g., in the form of an n bit of information that uniquely identifies the failed port). The generator then sends a signal to the packet generator and includes the identification of the failed port (e.g., in the form of an m bit of information that uniquely identifies the failed port).

The packet generator 211 then generates one or more packets 270 that are placed in ingress pipeline 221. As described below, a predetermined set of fields of the packet(s) 270 matches the matching criteria of one or more match-action stages in the packet pipeline.

Referring back to FIG. 1, the figure shows one of the ingress pipeline, egress pipeline, and packet generators of FIG. 2. Once the packet generator 170 receives a triggering event, the packet generator generates one or more packets 175 that correspond to the triggering event. The packet goes through the MAU match-action stages and matches a predefined match field. The action corresponding to the match field causes a preprogrammed action unit in the forwarding element to perform a set of operations required by the triggering event. For instance, if the triggering event is a signal that indicates a port failure, the corresponding operations may be identifying a status bit associated with the failed port and resetting the stats bit to indicate that the associated port has failed.

The hardware forwarding element of some embodiments processes network packets according to a series of match-action tables that specify when to perform certain operations on the packets. The match-action tables include match entries that specify sets of match conditions that can be met by packets, and corresponding action entries that specify operations to perform on packets that meet the match conditions.

As an example, the match entry of a match-action table might match on the identification of a failed port. The corresponding action entry might specify that the status bit of the link in a status table has to be set to off. As another example of how match-action units operate, a match-action table might match on the destination address of an ingress packet and specify an output port to which to send the packet. Different destination addresses (i.e., different match entries) correspond to output actions to different ports (i.e., different action entries) of the forwarding element.

In some embodiments, the forwarding element includes a set of unit memories (e.g., SRAM and/or ternary content-addressable memory (TCAM)). The unit memories implement a match-action table by having a first set of the unit memories store the match entries and a second set of the unit memories store the action entries. That is, for a particular match entry and the corresponding action entry, the match entry is stored in a first unit memory and the action entry is stored in a second unit memory.

Some embodiments arrange the unit memories in a grid of rows and columns, with horizontal and vertical routing resources that connects the unit memories to arithmetic logic units (ALUs), also referred to as action units, that read the data from the unit memories in order to perform the match and action operations. In some such embodiments, a first pool of unit memories within a grid (e.g., a set of one or more columns of the grid) are utilized for the match entries, and a second pool of unit memories within the grid are utilized for the action entries. Some embodiments assign other functions of the forwarding element to unit memories within the grid as well, including statistics, meters, state, ternary indirection, etc. In some embodiments, the match memories are segregated (assigned to a specific set of columns, such as those closest to the ALUs) while the remaining memories in the grid are used for implementing memories for other functions (statistics, meters, etc.).

Each match entry of some embodiments includes two portions: the set of match conditions for a packet to meet, and an address of the action entry to read when the set of match conditions is met by a packet. The address, in some embodiments, specifies both a memory page that indicates a unit memory within the grid of unit memories, and a location within that memory page.

B. Packet Generator

Figure 3:
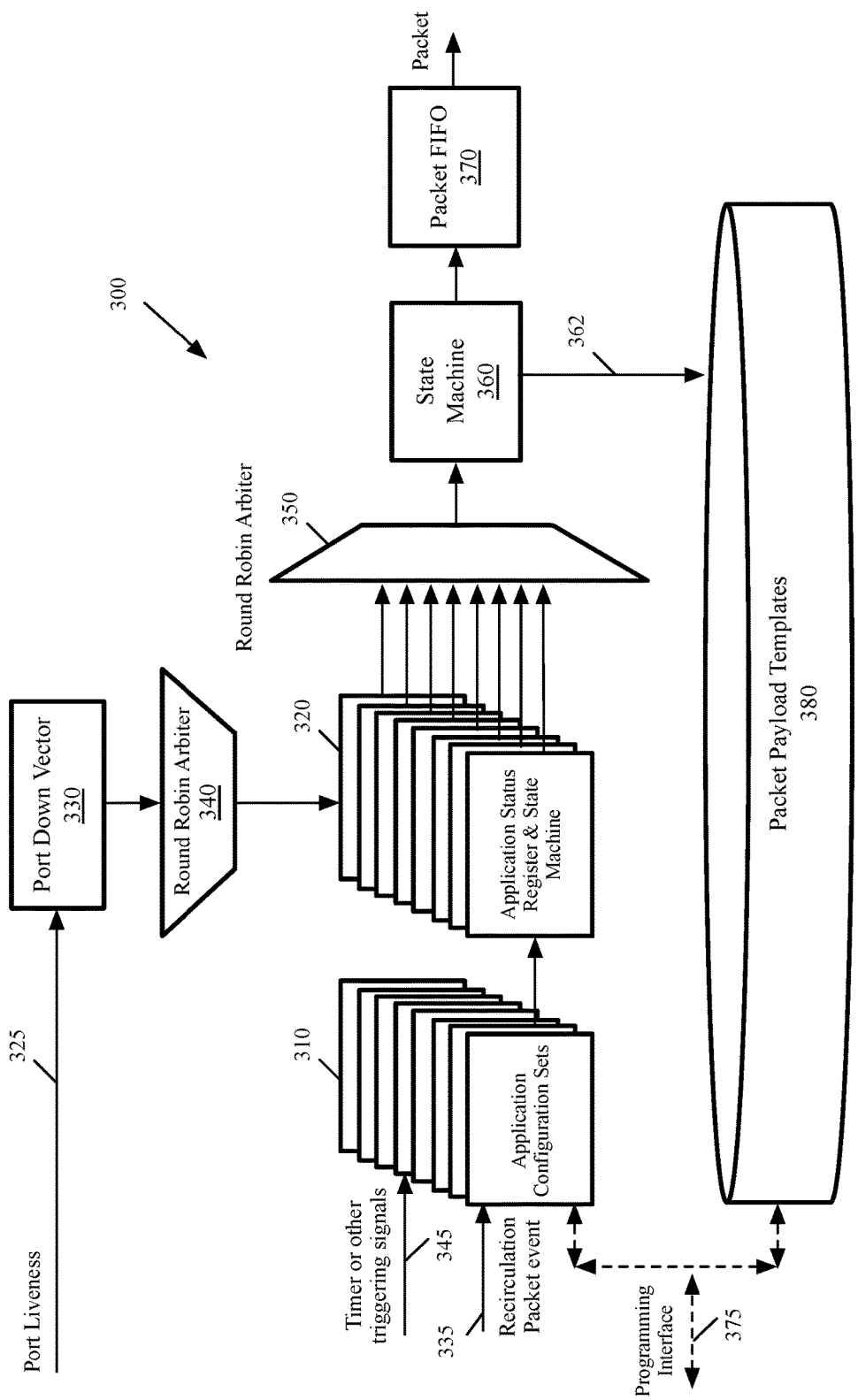
FIG. 3 conceptually illustrates a block diagram of a packet generator in some embodiments.

FIG. 3 conceptually illustrates a block diagram of a packet generator 300 in some embodiments. The packet generator 300 is similar to packet generator 170 in FIG. 1 and packet generators 211-214 in FIG. 2 and generates packets and places the packets in the ingress pipeline of a forwarding elements.

As shown, the packet generator receives several different triggering events. These events include port down events, packet recirculation, timer events, etc. The port down event indicates that a port (e.g., an egress port of the forwarding element) has failed. The triggering signal for this event, in some embodiments, occurs at an edge (e.g., failing edge or rising edge) of a port liveness signal 325. The signal carries other information that identifies the particular port that has failed.

The packet recirculation event 335, in some embodiments, occurs when a set of fields (e.g., the first 32 bits) of a recirculation packet matches a predefined match value. In embodiments that utilize TCAM, the match value includes a corresponding mask to mask out the bits that are not used for matching. Other triggering events 345 include but are not limited to signals indicating the expiration of one-time timers or periodic timers. A one-time timer monitors an enable bit and on a rising (or falling) edge of the enable bit generate a signal (either immediately or after a predetermined number of clock cycles). A periodic timer also monitors an enable bit and generates a signal on the rising (or falling) edge of the enable bit (either immediately or after a predetermined number of cycles). The signal is generated on a predetermined period until the enable bit is disabled.

It should be understood that the triggering events are not limited to the examples provided. In general, data plane actions for any event can be performed by pre-programming one or more match-action stages in the forwarding element pipeline. A signal is then generated (similar to signals 345) at the occurrence of the event. When the packet generator receives the signal, the packet generator generates a packet with a match field that matches the pre-programmed match criteria of the event. The packet generator places the packet in the ingress pipeline of the forwarding element. Once the packet matches the match criteria of the match-action stage that is pre-programmed to handle the event, the corresponding action or actions are performed by the pre-programmed action stage. It should also be understood that the packet generators in some embodiments might not handle every triggering events shown in FIG. 3. For instance, in some embodiments, the packet generator may not recirculate packets or may not generate packets upon a port failure event, or may not generate packets in response to expiration of timers.

The packet generator uses a set of one or more applications from a group of applications to generate packets for each triggering event. Each application is programmed to generate packets for one of the triggering events. The packet generator has a state machine. Each application that is selected to run uses the state machine for generating the packets. Each application has a configuration set and uses a packet payload template. The packet payload template is used to identify different field of the packets that are generated for a triggering event.

Packet generator in some embodiments generates packets according to different software programmable application configuration sets 310 and their corresponding packet payload templates 380. Programming in some embodiments is done through a cloud service router (CSR) 375. In some embodiments, an application must be disabled before changing the application's configuration set.

The configuration set identifies, e.g., what template to use to generate the packet, how many batches of packets to generate, how many packets are in each batch, what are the inter packet and inter batch gaps and jitters, etc. The configuration set is not limited to any specific protocols. Examples of what the configuration set may specify include an open systems interconnection (OSI) layer 2 (L2) destination address (e.g., a media access control (MAC) address) of the packet and/or an OSI layer 3 (L3) (e.g., an Internet protocol (IP) address) destination address of the packet. Other protocols and/or other data items can also be specified by the configuration set.

The port down vector 330 is used to accumulate port down events. For each monitored port, there is a corresponding bit in the port down vector and a port_down_dis bit (maintained outside the packet generator). At the falling edge of port liveness 325, if the port_down_bit is not set, the corresponding bit in the port down vector is set to indicate a port down event. A round robin arbiter 340 is used to pick one of the port down events to process. The port down vector bit is cleared and port_down_dis is set when the event is selected by the arbiter. The port_down_dis is, therefore, set in the data plane by hardware once a port down pending bit has been selected for arbitration. The port_down_dis is reset in some embodiments by software once a port is back up. Port down arbitration is performed only when there is no pending port down application events.

The round robin arbiter 350 selects one of the applications to be used by the packet generator to generate a packet. The packet generator uses the state machine 360 by the selected application to access the application's corresponding packet payload template (as shown by 362) and configuration set to generate the packet. The generated packet is placed in a packet FIFO 370 to be send into the forwarding element's ingress pipeline. A group of priority packet arbiters (one per channel) are used to select between the recirculation packets and the packets generated by the packet generator. Details of these arbiters are described below by reference to FIG. 8.

Figure 4A:
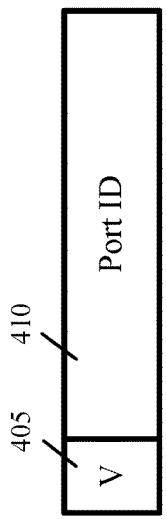
FIG. 4A illustrates the format of the status stored for a port down event in some embodiments.
Figure 4B:
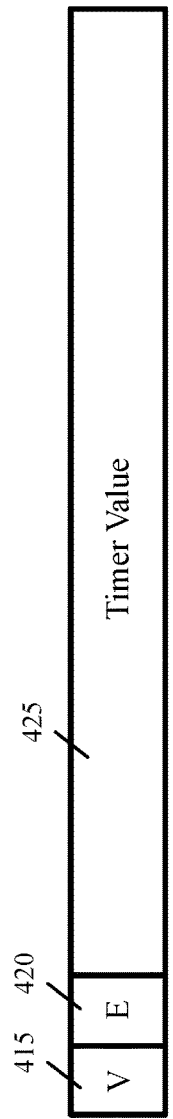
FIG. 4B illustrates the format of the status stored for a timer event.
Figure 4C:
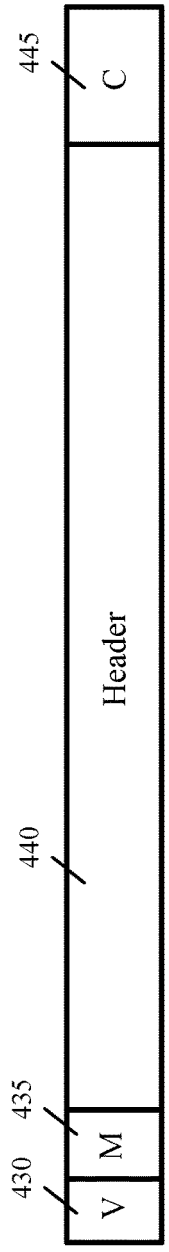
FIG. 4C illustrates the format of the status stored for a recirculation event.

Each application configuration set 130 has a corresponding application status register 320. Each application status register is used to store pending status of the corresponding application. FIGS. 4A-4C illustrate example of status registers used to store pending status of different applications.

FIG. 4A illustrates the format of the status stored for a port down event in some embodiments. As shown, the status includes a valid bit 405 and a port identification (port ID) 410. The valid bit is set when port down vector is granted and cleared when the corresponding application is idle. Port ID 410 stores the port number of the port for which the port down vector is granted. For instance, if there are 128 ports being monitored, then port ID 410 is a 7-bit field to store one of the port numbers.

FIG. 4B illustrates the format of the status stored for a timer event. As shown, the status includes a valid bit 415, an enabled bit 420, and a timer value 425. The timer value 420 is loaded with the timer count at the time when either valid bit 415 or enabled bit 420 is set and is decremented at a set interval when timer is not 0. The timer value field 425 is large enough to store the value of the longest timer used to trigger packet generation.

The valid bit 415 is set when the enabled bit 420 is set and the timer is 0. The valid bit 415 is cleared when the application is in idle state. The enabled bit 420 is set at the rising edge of application enable signal and cleared when the timer is 0 and the timer is a one-time timer.

FIG. 4C illustrates the format of the status stored for a recirculation event. As shown, the status includes a valid bit 430, a match bit 435, a header 440, and a channel field 445. The channel field 445 is set to the channel number of the recirculation packet at the time when the match bit 435 is being set. For instance, if there are a maximum of 4 channels, then the channel field 445 requires 2 bits to store any of the possible channel numbers.

The header 440 is set to the value of a group of header fields of the recirculation packet at the time when the match bit 435 is being set. The valid bit 430 is set when the match bit and a set of criteria for the transmission channel (e.g., no transmission errors) are met. The match bit is set when a set of header fields of the recirculation packet match a predetermined value. The match bit 435 is reset at the when valid bit 430 is being cleared and a set of criteria for the transmission channel is met.

Figure 5:
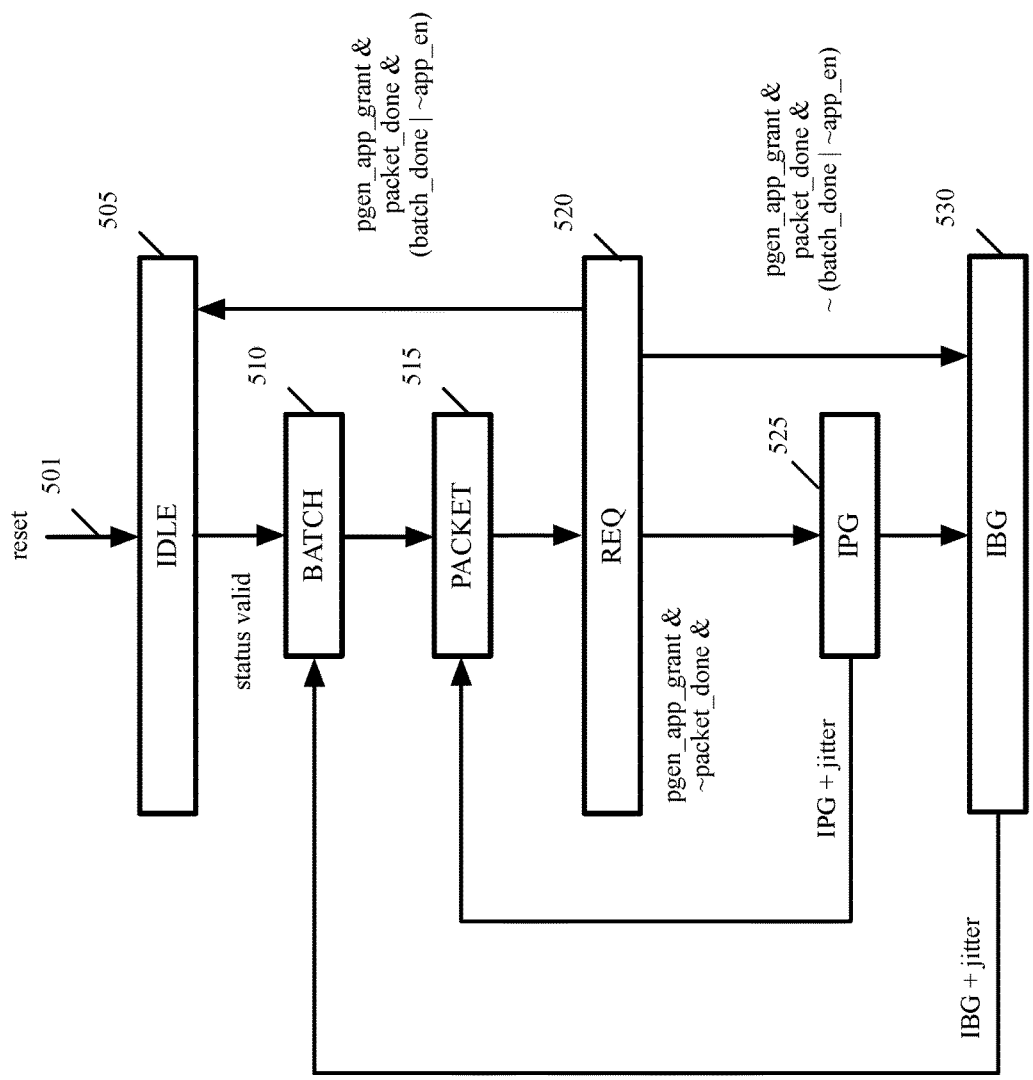
FIG. 5 conceptually illustrates the packet generator application event state machine in some embodiments.

FIG. 5 conceptually illustrates the packet generator application event state machine in some embodiments. The application starts in IDLE state 505 where the pending application event is cleared. IDLE state 505 is entered when the state machine is reset (as shown by reset arrow 501) or from REQ state 520 as described below.

Once the application's valid bit is set to indicate that the status is valid (as described above by reference to FIGS. 4A-4C), the state machine transfers to the BATCH state 510. In BATCH state, a batch timer is armed to decrement and the state machine transfers to PACKET state 515. In PACKET state 515, a packet timer is armed to decrement and the state machine transfers to REQ (or request) state 520.

In REQ state 520, the application presents packet request to the packet generator application arbiter 350 shown in FIG. 3. Once the request is granted (as shown in the figure by the logical condition pgen_app_grant being true), the state machine either goes (i) to inter-packet gap (IPG) state 525 if there are still pending packets in the batch (as shown by logical condition packet_done being false), (ii) to inter-batch gap (IBG) state 530 if there are no pending packets in the current batch but there are still pending batches for the application (as shown by logical condition packet_done being true, logical condition batch_done being false, and logical condition app_en (application enabled) being true), (iii) or goes to IDLE state 505 and disabled the application if all packets of all batches have been processed (as shown by packet_done being true, batch_done being true and app_en being false). IPG state 525 and IBG state 530 are used as wait states between packets and batches.

Figure 6:
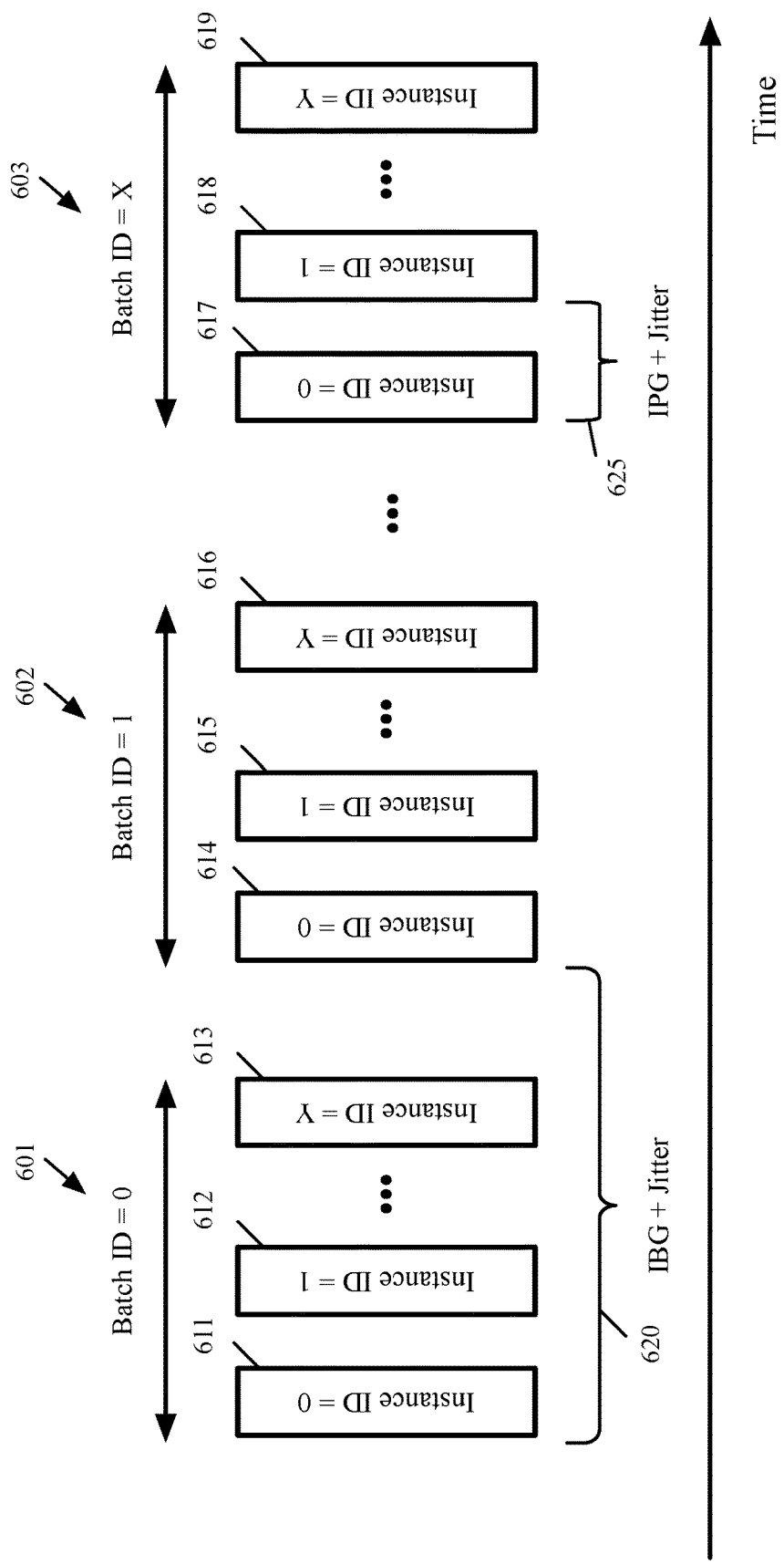
FIG. 6 conceptually illustrates a portion of the packet generation timeline in some embodiments.

In some embodiments, a triggered event may generate a programmable number of batches with a programmable number of packets per batch. FIG. 6 conceptually illustrates a portion of the packet generation timeline in some embodiments. As figure shows, several packet batches 601-603 are generated by the packet generator. Each batch has a group of packets. For instance batch 601 has packets 611-613, batch 602 has packets 614-616, and batch 603 has packets 617-619.

The inter-batch gap and jitter 620 is the time between two consecutive packet batches. The inter-packet gap 625 is the time between two consecutive packets in the packet batch. The inter-packet and inter-batch gaps as well the maximum jitter are programmable in some embodiments. In addition, the inter-batch jitter and inter-packet jitter are randomized.

In some embodiments, the jitter values (e.g., a 64-bit value) between packets and batches are randomized with a linear feedback shift register (LFSR) using a polynomial such as:

$$X^4+X^3+X^2+1$$

The LFSR starts with 0, and then bits 4, 3, 2 and 0 are exclusive OR'ed (XOR) and inverted. The resulting value is shifted into bit 63 of the LFSR with each clock cycle when the application is enabled. After the IBG or IPG count is reached, the lower 32 bits of the LFSR are then used to match the corresponding batch or packet jitter value and a corresponding mask. When a match is detected, the next packet of the event is sent out. The implementation provides a PASTA (Poisson Arrival See Time Average) pattern of the event packets. A Poisson arrival observes the system as if it was arriving at a random moment in time. Therefore, the expected value of any parameter of the system at the instant of a Poisson arrival is the long-run average value of that parameter.

Figure 7:
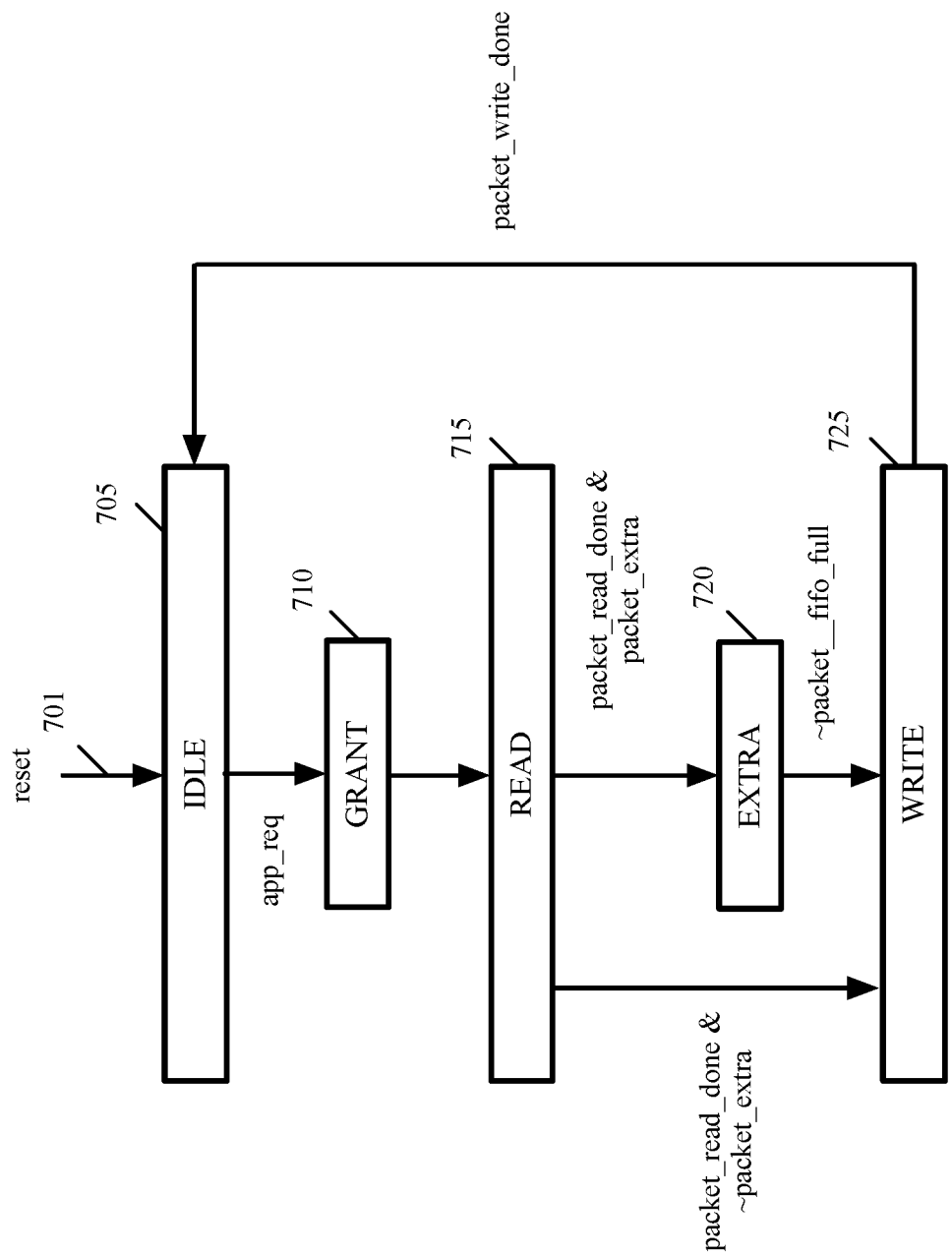
FIG. 7 conceptually illustrates the packet generator packet state machine in some embodiments.

FIG. 7 conceptually illustrates the packet generator packet state machine in some embodiments. A round robin arbiter 350 shown in FIG. 3 is used to select packet requests from the applications. The arbiter arbitrates on event boundaries. Arbitration is performed in IDLE state 705. IDLE state 705 is entered when the state machine is reset (as shown by reset arrow 701) or from WRITE state 725 as described below.

When the packet request is granted, the state machine transitions from IDLE state to GRANT state 710. In GRANT state 710, the selected request is latched and the state machine is transferred to READ state 715. In READ state 715, reads from the packet buffer are performed and packet data are pushed to the packet FIFO 370 shown in FIG. 3.

After packet reads are done (as shown in figure by the logical condition packet_read_done being true) in the READ state, the state machine either transfers to EXTRA state 720 or WRITE state 725. The EXTRA state 720 is used (when needed as shown by logical condition packet_extra being true) to reserve one cycle for one extra write to the packet FIFO.

The WRITE state 725 is used to ensure that all the packet data have been pushed to the packet FIFO 370 before returning to IDLE state 705 (as shown by logical condition packet_write_done being true) to process another packet. The packet FIFO 370 has enough entries to hold at least one packet for each application and is used to stage generated packets for port arbitration.

Figure 8:
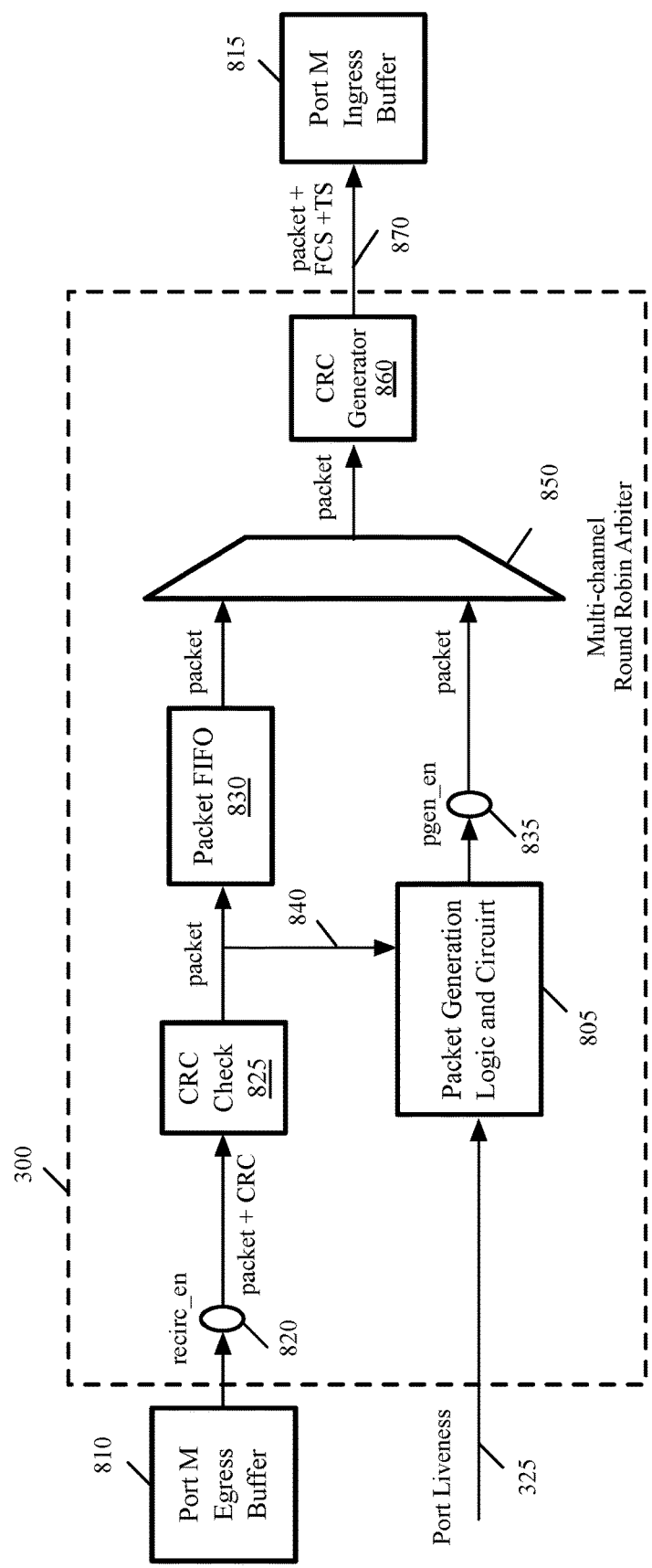
FIG. 8 conceptually illustrates data flow for a port that supports packet generation and packet recirculation in some embodiments.

A set of priority packet arbiters, one per channel, is used to select between the recirculation packets and the generated packets in some embodiments. FIG. 8 conceptually illustrates data flow for a port that supports packet generation and packet recirculation in some embodiments. In the example of FIG. 8, port M (e.g., port 17) of the packet generator supports packet generation and/or packet recirculation. The port has an egress buffer 810 where the recirculated packet is fed back to the packet generator 300 from an egress path. The port also has an ingress buffer 815 for putting the recirculated packet back in an ingress pipeline.

When recirculation is enabled (as conceptually shown by 820), the packet generator checks (as shown by 825) the incoming egress packet's cyclic redundancy check (CRC). The packet generator then removes the CRC and pushes the packet into a FIFO 830. The packet generator, when enabled (as conceptually shown by 835), snoops recirculation packets (as shown by arrow 840), port liveness signal (as shown by 325) and internal timer signals (not shown). The packet generator generates packets using packet generation logic and circuitry 805 as described by reference to FIG. 3.

A recirculation packet is used in some embodiments to perform operations based on conditions that are detected when a packet is being transmitted from the forwarding element. For instance, a link aggregation (LAG) combines multiple network connections in parallel to provide throughput and redundancy. When a packet is transmitted on a LAG and the last member of the LAG fails, the packet may recirculate a copy of itself back to an ingress pipeline with an indication that this packet is recirculated to indicate that a LAG has failed. The packet generator then generates a set of packets to mark the LAG as failed.

The multi-channel priority arbiter (e.g., n-channel arbiter with n being the number of supported channels) 850 then selects between the pending recirculation packet or the packet generator packet. The packet generated by the packet generator has the highest priority. The selected packet is then passed to the CRC generator 860. The packet generator generates a frame check sequence (FCS) as the CRC and adds in the timestamp (as shown by 870) before sending the ingress packet out to the ingress buffer 815.

Both the recirculation FIFO 830 and the packet generator FIFO 370 provide per channel "packet valid" signals to the arbiters 845 and 350, respectively. Each arbiter arbitrates on packet boundaries and pops an entry from the selected packet FIFO when the channel sequence number matches its channel ID. The packet FIFO 370 in some embodiments is divided into a number of entries equal to (i) the number of channels supported by the packet generator (e.g., 4 channels) multiplied by (ii) the number of applications (e.g., 8 applications).

Figure 9:
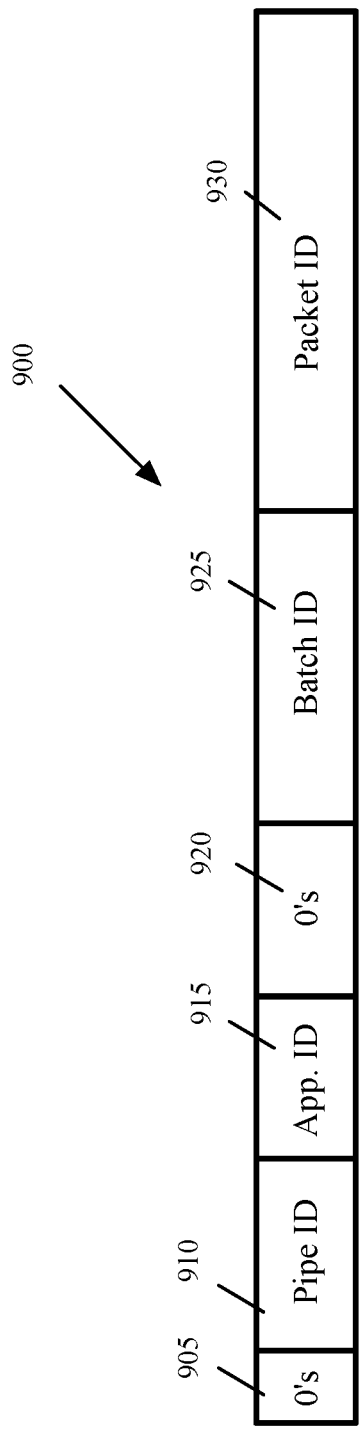
FIG. 9 conceptually illustrates a packet header added to a packet by the packet generator in some embodiments.

The packet generator in some embodiments adds a packet header for the packets generated for each triggering event. FIG. 9 conceptually illustrates a packet header 900 added to a packet by the packet generator in some embodiments. In this example, some of the header fields such as 905 and 920 are not used and are set, e.g., to 0.

The header includes a pipeline identification (pipe ID) 910, an application identification (APP ID) 915, a batch identification (bath ID) 925, and a packet identification (packet ID) 930. The pipe ID 910 identifies the pipeline where the packet is generated. The App ID identifies the application that has generated the packet.

The batch ID 925 for a timer event starts at 0 and is incremented for each subsequent batch. The packet ID 930 for a timer event starts at 0 and is incremented for each subsequent packet in a batch.

The batch ID 925 for a port down is set to the failed port number. The packet ID 930 for a port down event starts at 0 and is incremented for each subsequent packet in a batch.

The batch ID 925 for a recirculation event starts at the recirculation packet key and is incremented for each subsequent batch. The packet ID 930 for a recirculation event starts at 0 and is incremented for each subsequent packet in a batch.

Figure 10:
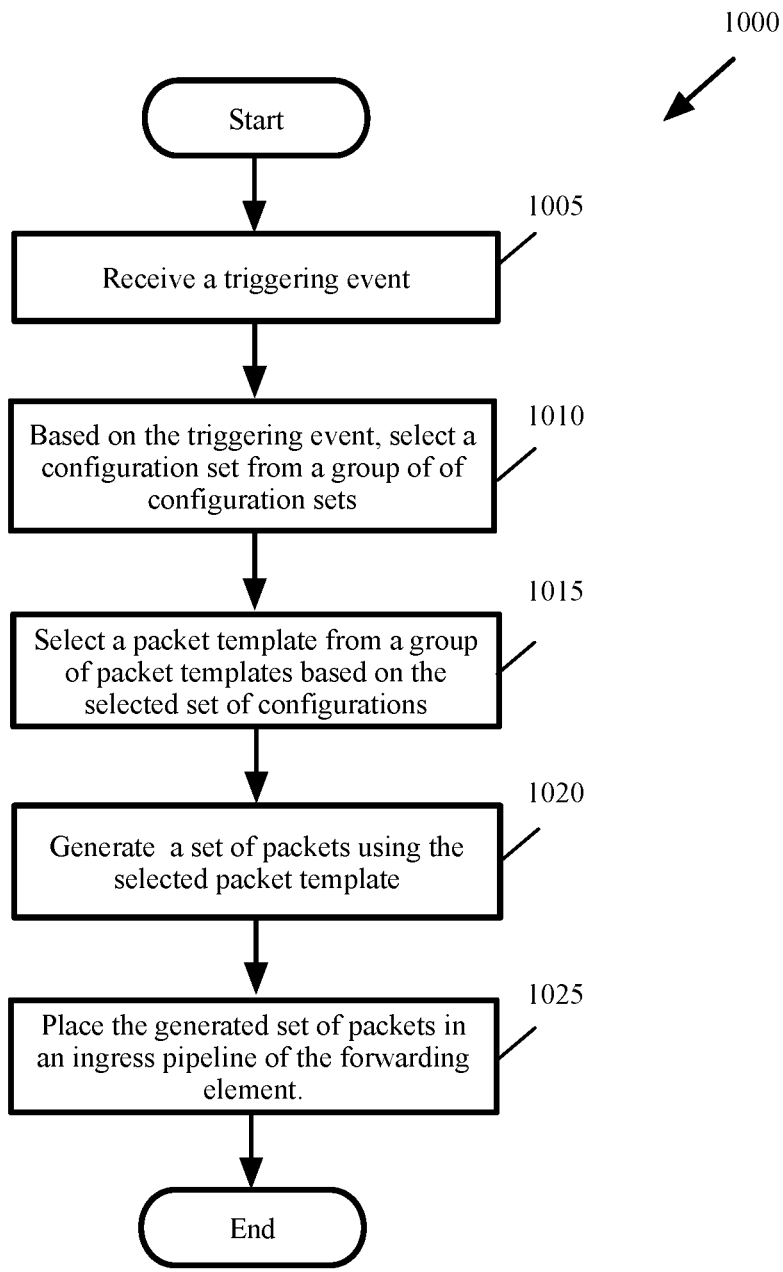
FIG. 10 conceptually illustrates a process generating packets in the data plane of a forwarding element some embodiments.

FIG. 10 conceptually illustrates a process 1000 for generating packets in the data plane of a forwarding element some embodiments. The process in some embodiments is performed by a packet generator such as packet generator 300 shown in FIG. 3.

As shown, the process receives (at 1005) a triggering event. For instance, the process receives a triggering event such as port liveness 325, recirculation packet event 335, a timer or other triggering signals 345 as shown in FIG. 3.

The process then selects (at 1010) a configuration set from a group of configuration sets. For instance, the process selects a configuration set from the group of configuration sets 310 shown in FIG. 3.

The process then selects (at 1015) a packet template from a group of packet templates. For instance, the process selects a packet template from the packet payload templates 380 shown in FIG. 3. The packet template identifies different fields for the set of packets that the packet generator generates for the triggering event. In some embodiments, the packet templates include values such as the source address that are the same for all packets.

The process then generates (at 1020) a set of packets using the selected packet template. For instance, the process uses the state machine 360 (shown in FIG. 3) to generate one or more batches of packets with each batch having one or more packets as shown in FIG. 6).

The process then places (at 1025) the packets in the ingress pipeline of the forwarding element. For instance, the process places the packets in the ingress pipeline 221 that is associated with the packet generator 211 that has generated the packets. The process places the packets in the ingress pipeline based on the priorities described above for packet arbitration by reference to FIGS. 3 and 8. The process then ends.

Figure 11:
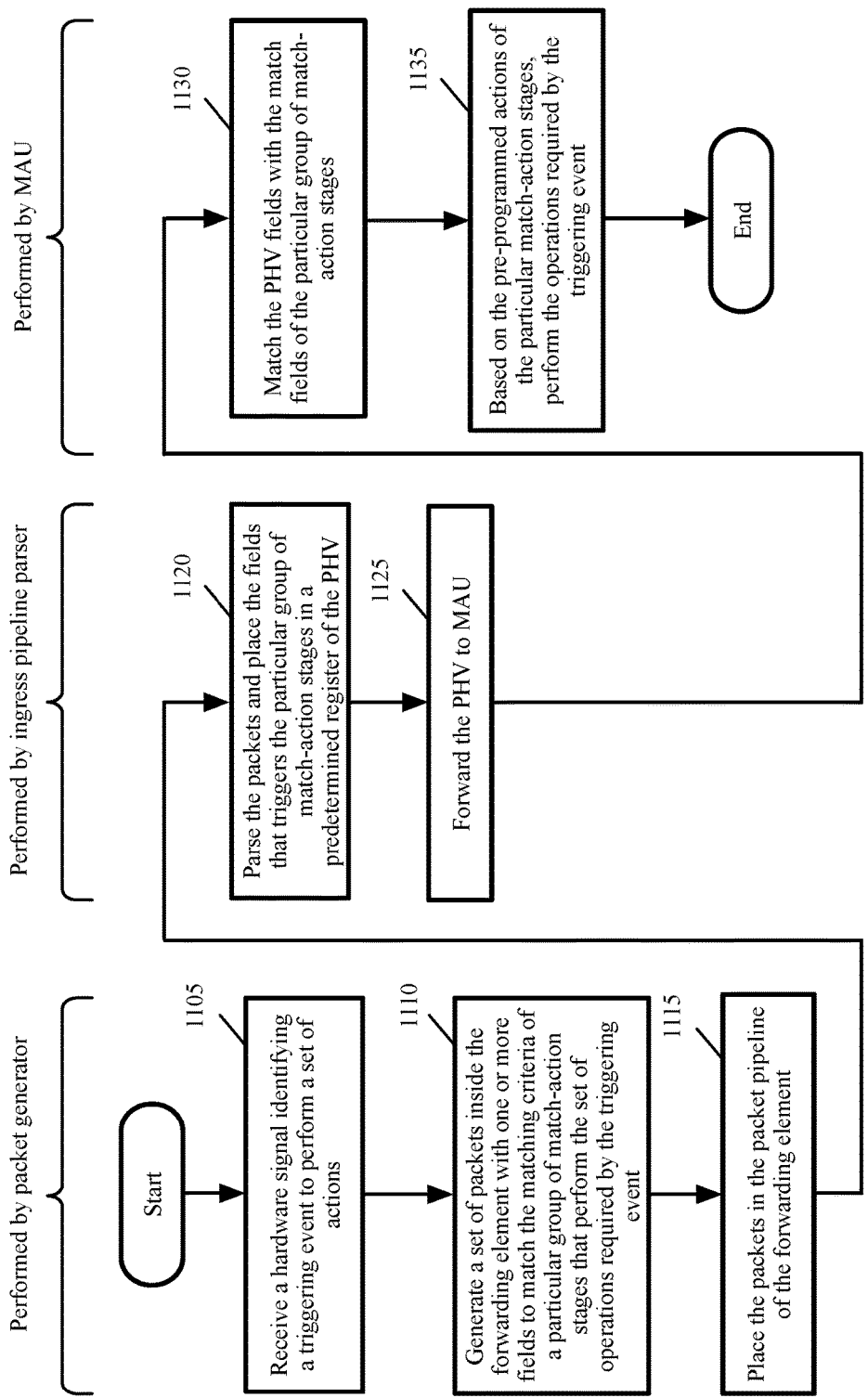
FIG. 11 conceptually illustrates a process that a forwarding element performs for generating and processing packets in the data plane of the forwarding element in some embodiments.

FIG. 11 conceptually illustrates a process 1100 that a forwarding element performs for generating and processing packets in the data plane of the forwarding element in some embodiments. As shown, different portions of the process are performed by the packet generator, the ingress pipeline parser, and the MAU of the forwarding element.

The process receives (at 1105) a hardware signal that identifies a triggering event to perform a set of actions. For instance, the process receives a signal that identifies that a port has failed. The set of actions to perform may include, e.g., setting a status bit corresponding to the failed port to 0. As another example, the triggering event is the receipt of a recirculation packet from an egress pipeline of the forwarding element and the required action is one or more of table updates caused by the generated packets in the match-action stages of the MAU (e.g., to remove) a next hop from an ECMP group of next hops. Another example is the expiration of a one-time (or one shot) timer or a periodic timer, which requires a set of actions to be performed in the data plane of the forwarding element.

The process then generates (at 1110) a set of packets inside the forwarding element (e.g., packets 611-619 generated in FIG. 6). The process sets the values of one or more fields in each generated packet to match the matching criteria of a group of one or more match-action stages of the forwarding element. For instance, the process places the identification of a failed port that is identified by a port liveness signal in a particular field of the packets header.

The process then places (at 1115) the packets in one of the ingress pipelines of the forwarding element. For instance, the process places the packets in the ingress pipeline 221 that corresponds to the packet generator 211 that has generated the packets as shown in FIG. 2.

The process then parses (at 1120) the packet and places the fields that are used to match different match-action criteria in predetermined registers (or containers) of the PHV. The process then forwards (at 1125) the PHV to the MAU. Next, the process matches (at 1130) the PHV fields with the match field of the particular match-action stages that are preprogrammed to match the PHV fields. For instance, the process matches the identification of a failed link with the match matching criteria of a match-action stage.

As described above, each match field has a corresponding action. Once a PHV field is matched by a match-action stage, the process uses (at 1135) the action that is preprogrammed to perform the operation required by the triggering event. For instance, the action may calculate a pointer to the location of the status bit of a failed port and that set the bit to 0. The process then ends.

C. Packet Generator-Based Bidirectional Forwarding Detection

Bidirectional forwarding detection (BFD) is a network protocol used to detect link failures between different forwarding elements. BFD establishes a session between two endpoints over a link that is going to be monitored for failure. Each endpoint may periodically send hello packets to the other endpoint. When an endpoint does not receive a number of hello packets, the monitored link is considered being down. Alternatively, each end point may send a stream of echo packets to the other endpoint. When a number of these packets are not sent back to the sender, the sender assumes that the monitored link is down.

Figure 12:
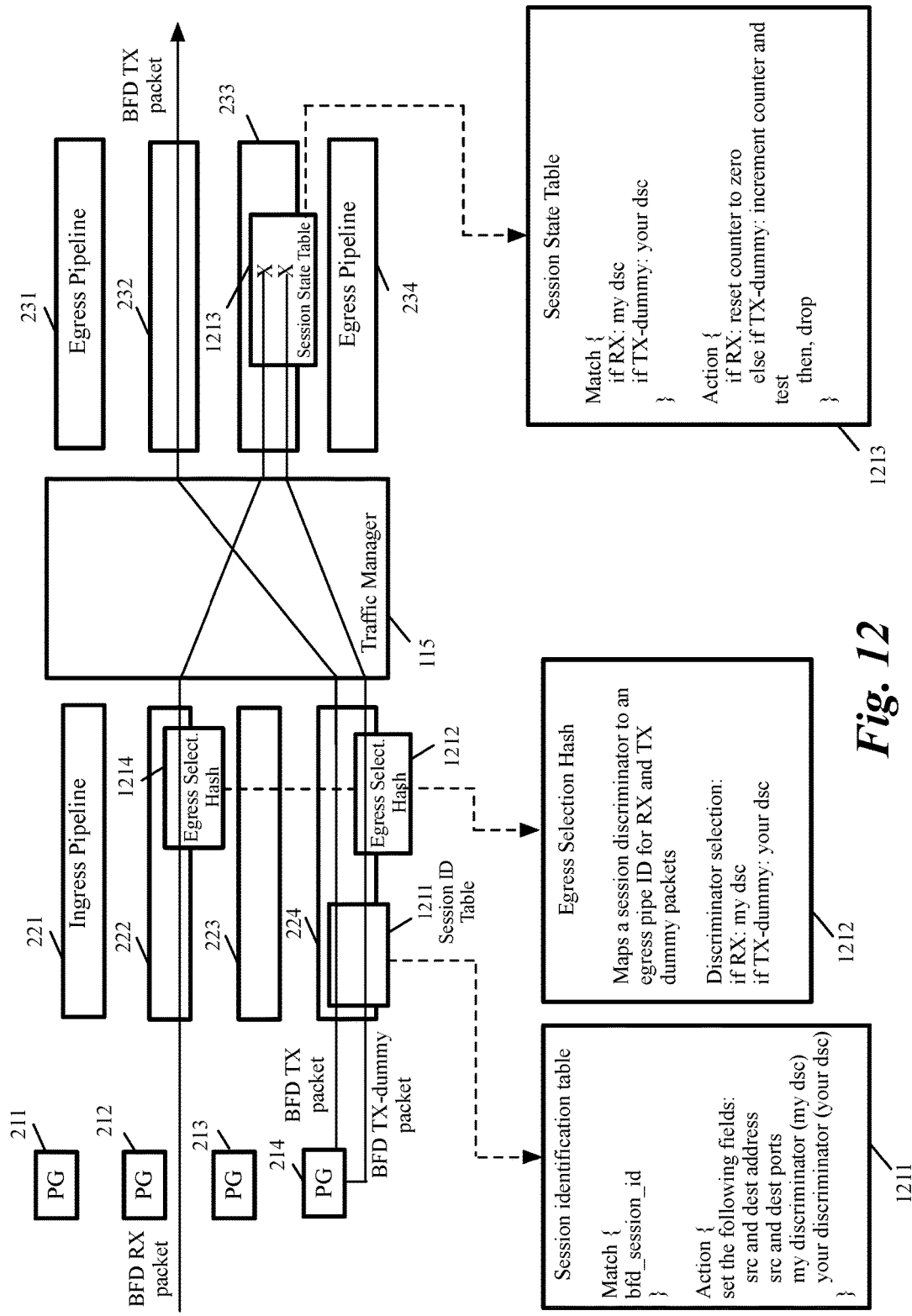
FIG. 12 conceptually illustrates using a packet generator for performing BFD in some embodiments.

FIG. 12 conceptually illustrates using a packet generator for performing BFD in some embodiments. Operations for the BFD are performed by hardware and firmware in the data plane of the forwarding element and, therefore, relives the processor (the CPU) of the forwarding element from performing the BFD.

The figure shows traffic manager 115, several ingress pipelines 221-224 (each pipeline similar to ingress pipeline 110 in FIG. 1), several egress pipelines 231-234 (each pipeline similar to egress pipeline 120 in FIG. 1), and several packet generators 211-214 (each packet generator similar to packet generator 170 in FIG. 5). Each packet generator 211-214 is associated with one ingress pipeline 221-224. For instance, packet generator 211 is associated with ingress pipeline 221.

A session identification (session_id) is assigned to each BFD session. A session state table 1213 is used as a stateful table to keep track of the status of the links that are monitored by using BFD. Each BFD session has a counter that is reset to 0 when a BFD receive packet (BFD RX packet) is received for a BFD session, indicating that the corresponding link is operational. The BFD RX packet is then dropped. There may be many BFD sessions going on at each time and the counter of these BFD sessions may be spread among different egress pipelines. However, the counter of each BFD session is maintained in only one of the egress pipelines.

For each BFD transmit packet that is sent out, a corresponding transmit dummy packet is also generated that causes the counter for the BFD session to be incremented. When the counter reaches a pre-determined value, the link corresponding to the BFD session is marked as failed (i.e., when a pre-determined number of BFD transmit packets have been sent over the link that is being monitored without receiving any BFD RX packets from the other endpoint).

As shown, a packet generator (e.g., packet generator 214) that is performing BFD for a particular session, periodically generates two transmit packets for the session: a BFD transmit (BFD TX) packet and a transmit dummy (BFD TX-dummy) packet and places the packets in the ingress pipeline associated with the packet generator. The triggering event for generating the pair of packets by the packet generator in some embodiments is the expiration of a periodic timer as described above by reference to signal 345 in FIG. 3. The packets include a field that includes the BFD session's identification (bfd_session). The BFD TX-dummy packet has a field that identifies the packet as a dummy packet. The BFD TX packet is sent to the forwarding element at the other endpoint of the monitored link. The BFD TX-dummy packet is used to update the session state table 1213.

As described above, each pipeline 221-224 includes a group of match-action stages. In this example, the match criteria of one of the match-action stages is pre-programmed to match the bfd-session of the packets. The corresponding action then uses a session identification table 1211 to set the following information in the BFD TX and BFD TX-dummy packets: the source and destination addresses, the source and destination ports, and the identification of the source endpoint of the monitored link and the destination endpoint of the monitored link.

The source address is e.g., set to L3 address (e.g., the IP address) and the source port is e.g., set to L4 port of the forwarding element that includes the packet generator 214. The destination address is e.g., set to L3 address (e.g., the IP address) and the destination port is e.g., set to L4 port of the forwarding element that is on the other end of the link being monitored.

The identification of the source forwarding element in this example is my discriminator (or my dsc) and the identification of the destination forwarding element is your discriminator (or your desc). Each one of these discriminators uniquely identifies the forwarding elements at each end of the monitored link for the particulate session. In some embodiments, for each forwarding element that has multiple BFD sessions, different my discriminators are used to identify the forwarding element for each session.

The BFD TX packet is then placed on an egress pipeline 232 according to the source port number. In this example, the BFD TX packet includes a source port number that causes the TX packet to be placed in egress pipeline 232. The BFD TX-dummy packet, on the other hand, is placed on an egress pipeline 233 that maintains the session state table 1213 for the BFD session.

Another match-action stage in the ingress pipeline matches the session discrimination of the BFD RX and BFD TX-dummy packets. The corresponding action performs a hash computation (shown as egress selection hash 1212) to determine the egress pipeline for the packet. For a BFD TX-dummy packet, the egress selection hash selects your dsc field to calculate the hash. For a TX-dummy packet, your dsc field identifies the forwarding element at the other end of the monitored link. For a BFD RX packet, the egress selection hash selects my dsc field to calculate the hash. Since the RX packet was generated by the forwarding element at the other end of the link, my sdc field in the BFD RX packet also identifies the forwarding element at the other end of the monitored link. As a result, both BFD RX and BFD TX-dummy packets of the same BFD session are sent to the same egress pipeline. This is illustrated in the example of FIG. 12 by receiving the BFD RX packet in ingress pipeline 212 and sending the BFD RX packet to egress pipeline 233 by egress selection hash 1214, which is the same egress pipeline that BFD TX-dummy is sent by the egress selection hash 1212.

The discriminators of the BFD RX and BFD TX-dummy packets then match the matching criteria of another match-action stage in the egress pipeline and the corresponding action updates the counter that corresponds to the BFD session. For the BFD TX-dummy packet, the discriminator to match is your desc and the corresponding action increments a counter associated with the session. The counter value is then checked and if the value is larger than a predetermined number, the link associated to the session is presumed down. The transmit dummy packet is then dropped.

Some embodiments maintain a status flag (e.g., a status bit) for each link. Once a link is determined to be down, the BFD transmit packet corresponding to the BFD transmit dummy packet is recirculated back to the packet generator in some embodiments. The recirculated packet would then cause a match-action stage to change the status of the link to failed (e.g., the status bit is set to 0). When the link is up again, the link status is set to operational or up (e.g., the status bit is set to 1). In other embodiments, the recirculated packet causes the packet generator to generate a set of packets to cause a match-action stage mark the failed link as down.

Some embodiments set the status of a failed link to failed in the data plane of the forwarding element in order to be able to quickly reroute the packets that were addressed to the destination at the other end of the failed link through an alternative link. For instance, when the counter exceeds a pre-determined value and a link is determined as failed, the location of the status bit of the failed link (e.g., as an index to a vector that keeps the status bits of the configured links) is computed and the bit is set to 0 to identify that the link has failed. When the link is up again, some of these embodiments set the status of the link to up by using the forwarding element's processor outside the data plane in order to allow the processor to use software to perform different initialization and house keeping operations in order to start using the link again.

Figure 13:
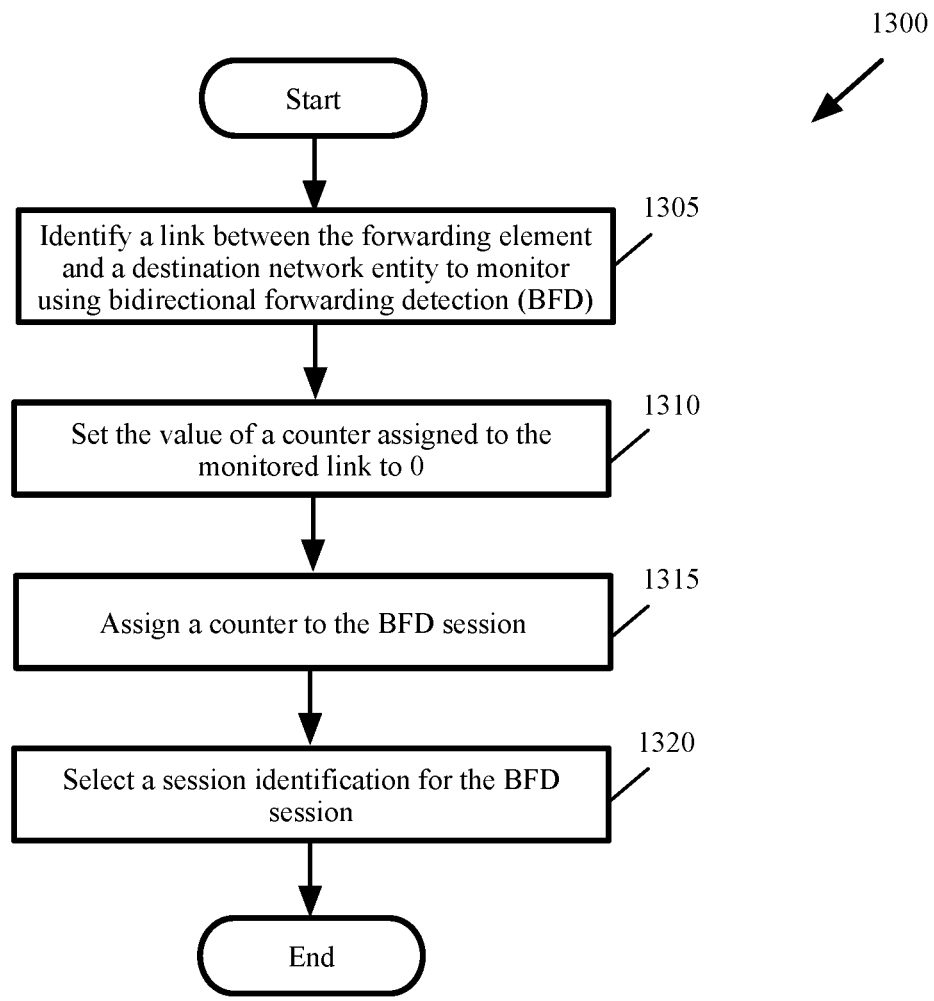
FIG. 13 conceptually illustrates a process for starting a BFD session in some embodiments to monitor a link between a forwarding element and a network entity such as another forwarding element.

FIG. 13 conceptually illustrates a process 1300 for starting a BFD session in some embodiments to monitor a link between a forwarding element and a network entity such as another forwarding element. The process is performed by the forwarding element in some embodiments. As shown, the process identifies (at 1305) a link between the forwarding element and another network entity (such as another forwarding element) to monitor by using BFD.

The process then assigns (at 1310) a counter to the BFD session. The process then sets (at 1315) the value of the counter to 0. The process then selects a session identification for the BFD session. The process then ends.

Figure 14:
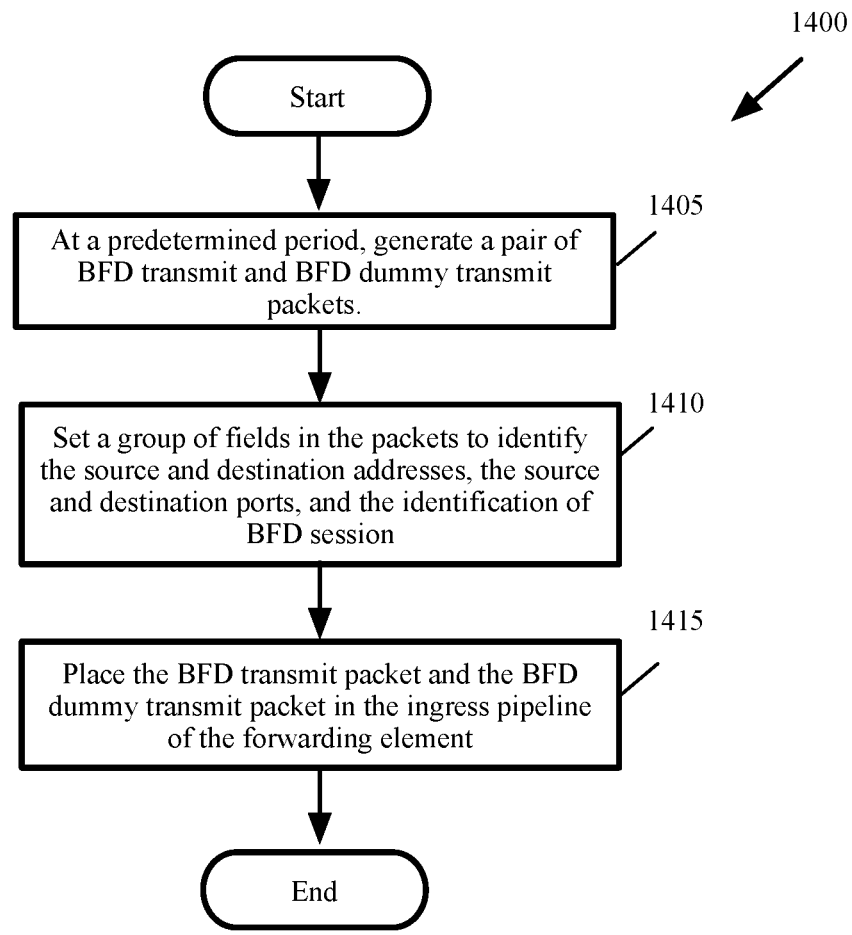
FIG. 14 conceptually illustrates a process for generating transmit packets for a BFD session to monitor a link between a forwarding element and a network entity such as another forwarding element in some embodiments.

FIG. 14 conceptually illustrates a process 1400 for generating transmit packets for a BFD session to monitor a link between a forwarding element and a network entity such as another forwarding element in some embodiments. The process in some embodiments is performed by a packet generator in the data plane of the forwarding element. For instant, the process is performed by packet generator 214 in FIG. 12.

As shown, the process generates a pair of BFD transmit and BFD transmit dummy packets at predetermined periods. For instance, the process generates the pair of packets as described above by reference to FIG. 12. The process then sets (at 1410) a set of fields in the packets to identify the source and destination addresses, the source and destination ports, and the identification of the BFD session. The source address is e.g., set to L3 address (e.g., the IP address) and the source port is e.g., set to L4 port of the forwarding element that includes the packet generator that is performing process 1400. The destination address is e.g., set to L3 address (e.g., the IP address) and the destination port is e.g., set to L4 port of the forwarding element that is on the other end of the link being monitored.

The process then places (at 1415) the BFD transmit packet and the BFD transmit dummy packet in the ingress pipeline of the forwarding element. For instance, the process places the BFD transmit packet and the BFD transmit dummy packet in ingress pipeline 224 associated with the packet generator 214 that is performing process 1400. The process then ends.

Figure 15A:
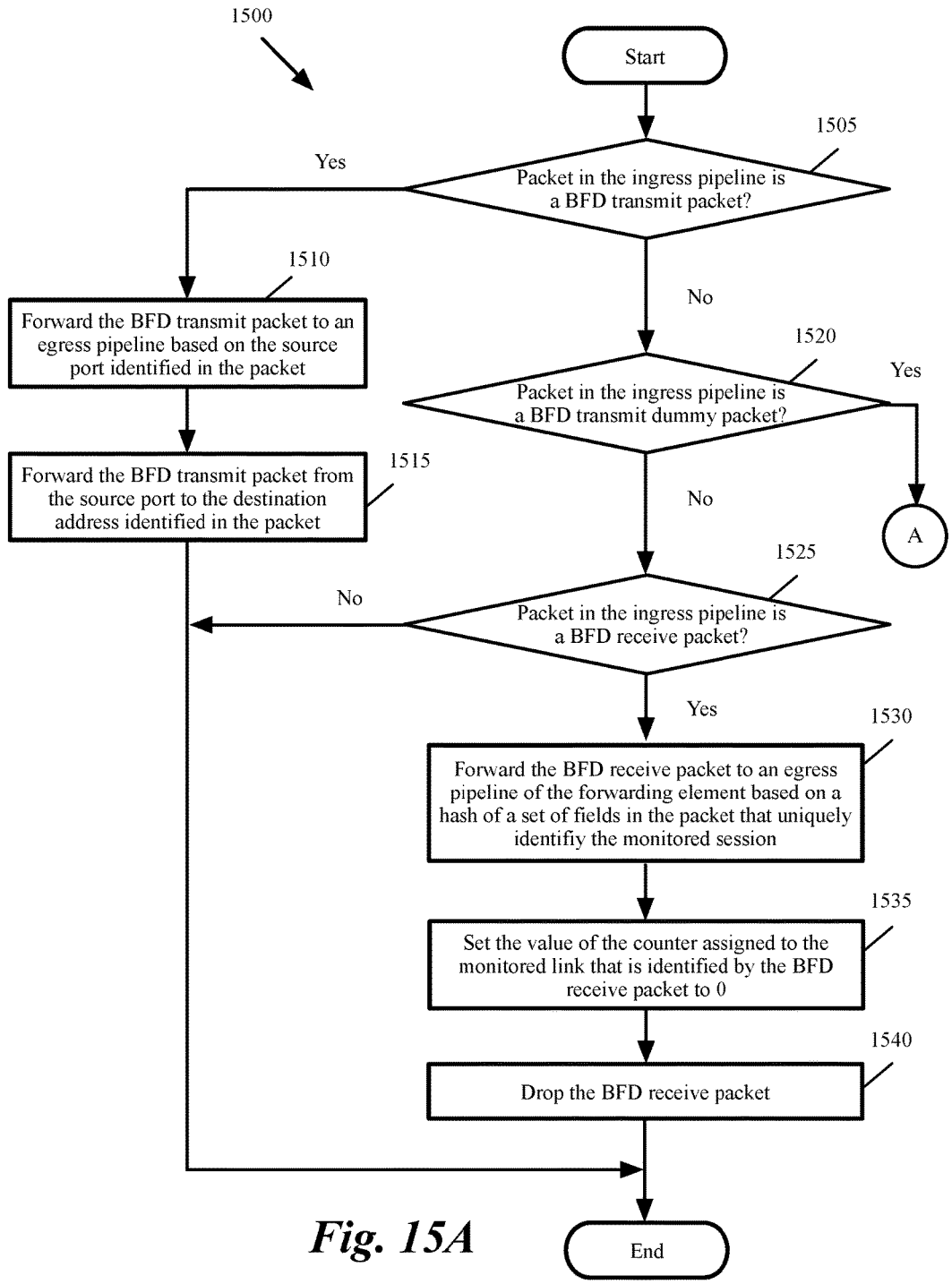
FIGS. 15A and 15B conceptually illustrates a process for processing BFD packets that are received in an ingress pipeline of a forwarding element in some embodiments.
Figure 15B:
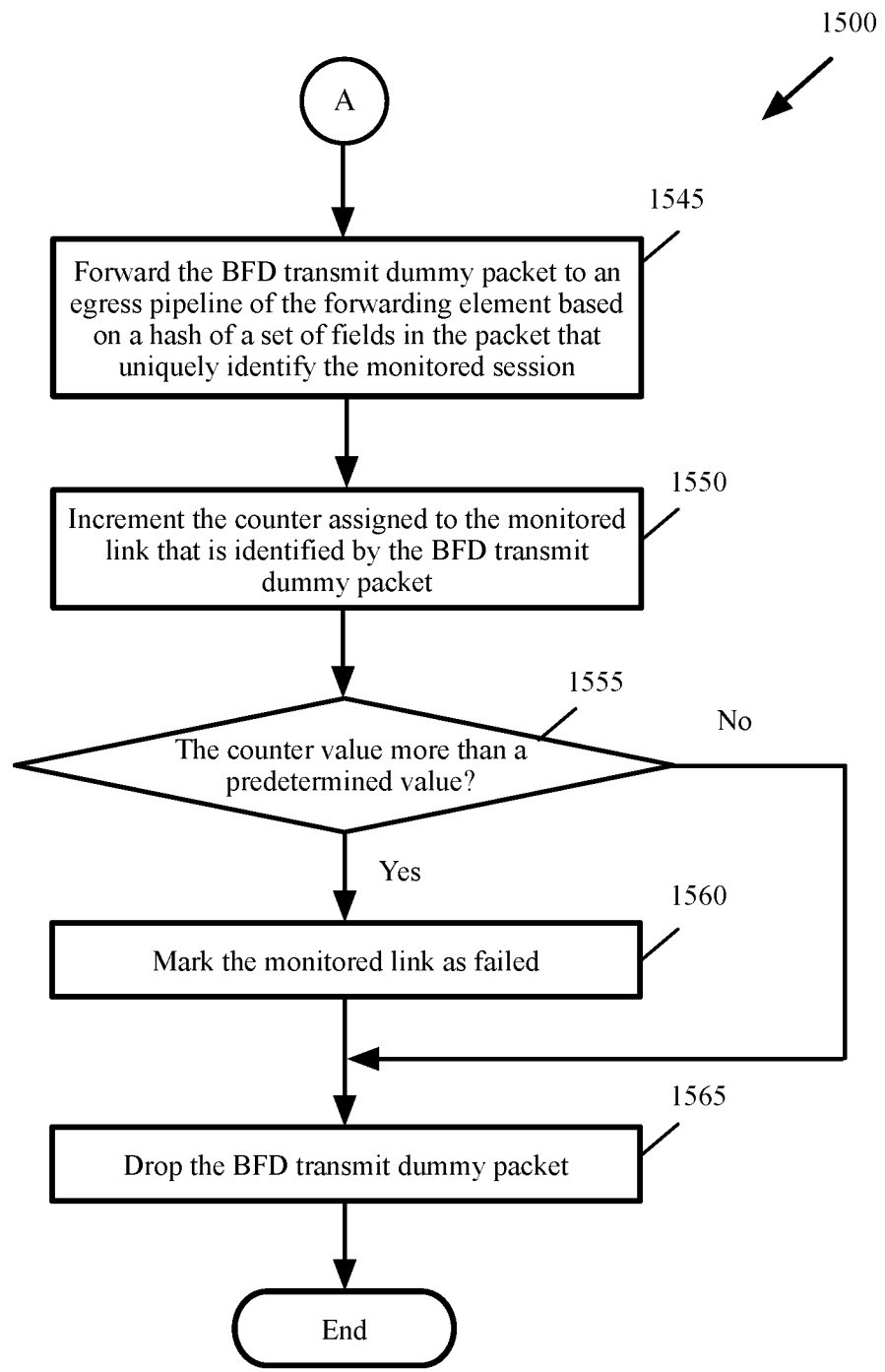

FIGS. 15A and 15B conceptually illustrates a process 1500 for processing BFD packets that are received in an ingress pipeline of a forwarding element in some embodiments. The process in some embodiments is performed by match-action units in the ingress and egress pipeline of a forwarding element.

As shown, the process determines (at 1505) whether a packet in the ingress pipeline is a BFD transmit packet. If not, the process proceeds to 1520, which is described below. Otherwise, the process forwards (at 1510) the BFD transmit packet to an egress pipeline of the forwarding element based on the source port identified in the packet. For instance, the process forwards a BFD TX packet to ingress pipeline 232 as shown in FIG. 12.

The process then forwards (at 1515) the BFD transmit packet from the source port to the destination address identified in the packet. For instance, the process transmits the packet to the next hop based on the L2 destination (the destination MAC address) identified in the packet. The process then ends.

When the packet is not a BFD transmit packet, the process determines (at 1520) whether the packet is a BFD transmit dummy packet. If yes, the process proceeds to 1545 in FIG. 15B, which is described below. Otherwise, the process determines (at 1525) whether the packet is a BFD receive packet. If not, the process ends.

Otherwise, the process forwards (at 1530) the BFD receive packet to an egress pipeline of the forwarding element based on a hash of a set of fields that uniquely identify the BFD session. For instance, the process forwards the BFD RX packet to egress pipeline 233 as shown in FIG. 12.

The process then sets (at 1535) the value of the counter assigned to the monitored link that is identified by the BFD receive packet to 0. Setting the counter value to 0 indicates that a packet is received from the monitored link and the link is, therefore, up. The process then drops (at 1540) the BFD receive packet. The process then ends.

When the packet in the ingress pipeline is a BFD transmit dummy packet, the process forwards (at 1545) the BFD transmit dummy packet to an egress pipeline of the forwarding element based on a hash of a set of fields in the packet that uniquely identify the monitored session. For instance, the process forwards BFD transmit dummy packet to egress pipeline 233 as shown in FIG. 12.

The process then increments (at 1550) the counter assigned to the monitored link that is identified by the BFD transmit dummy packet. The process then determines (at 1545) whether the counter value is more than a predetermined value. If not, the process proceeds to 1565, which is described below. Otherwise, the process marks (at 1560) the BFD session as failed.

For instance, assume that the receipt of n consecutive BFD transmit dummy packets (which causes the counter to be incremented) without receiving any receive packets (which cause the counter to be reset to 0) in some embodiments is an indication that the monitored link has failed. In these embodiments, the predetermine value in operation 1555 is n. Once the counter reaches n, it can be concluded that n BFD transmit dummy packets (and n BFD transmit packets) have been generated without receiving a response (i.e., a BFD receive packet) from the other end of the link. The link is, therefore, marked as failed. Next, the process drops (at 1565) the BFD transmit dummy packet. The process then ends.

II. Computer System

Figure 16:
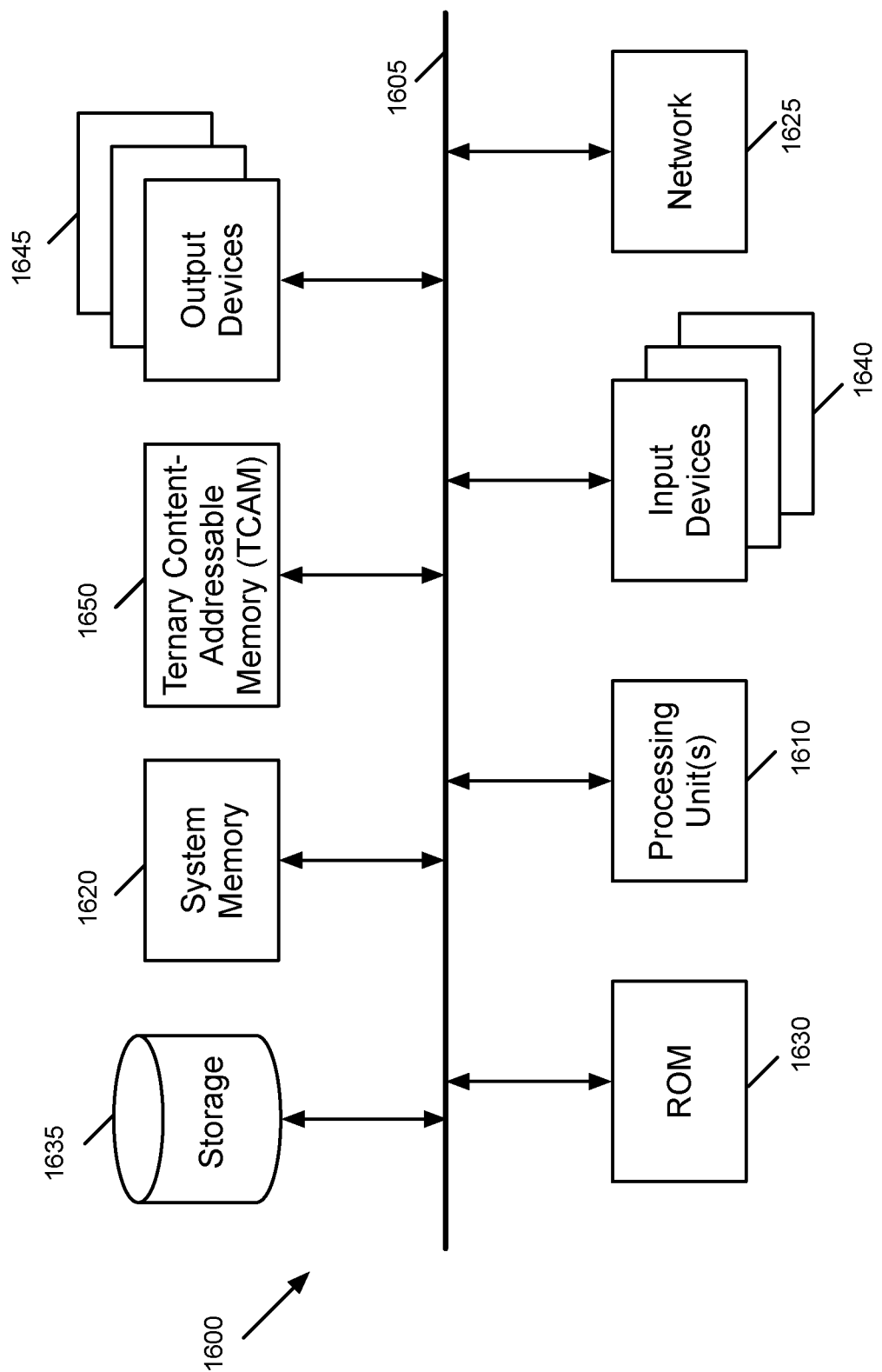
FIG. 16 conceptually illustrates an electronic system with which some embodiments of the invention are implemented.

FIG. 16 conceptually illustrates an electronic system 1600 with which some embodiments of the invention are implemented. The electronic system 1600 can be used to execute any of the control, virtualization, or operating system applications described above. The electronic system 1600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, system memory 1620, read-only memory (ROM) 1630, permanent storage device 1635, input devices 1640, output devices 1645, and TCAM 1650.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1620, and the permanent storage device 1635.

From these various memory units, the processing unit(s) 1610 retrieve instructions to execute and data to process in order to execute the processes of the invention. The processing unit(s) may be a single processor or a multi-core processor in different embodiments.

The read-only-memory 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1620 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1620, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 10, 11, 13, 14A, and 14B) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

In view of the foregoing, one of ordinary skill in the art would understand that the invention is not to be limited by the foregoing illustrative details, but rather is to be defined by the appended claims.

What is claimed is:

1. A method of performing packet-based bidirectional forwarding detection (BFD) by a hardware forwarding element, the hardware forwarding element comprising (i) a set of ingress pipelines for processing packets received at the forwarding element, each ingress pipeline comprising a packet generator configured to generate packets and place the packets in the ingress pipeline and (ii) a set of egress pipelines for processing packets prior to transmitting the packets from the forwarding element, the method comprising:

at a packet generator in a first ingress pipeline, (i) periodically generating a pair of packets to monitor a health of a particular egress link between the forwarding element and a network node, the pair of packets comprising a BFD transmit packet and a BFD dummy transmit packet, and (ii) placing the packets in the first ingress pipeline;

forwarding each BFD dummy transmit packet from the first ingress pipeline to a first egress pipeline;

incrementing a value of a BFD counter at the first egress pipeline after each BFD dummy transmit packet is received at the first egress pipeline;

transmitting each BFD transmit packet from a second egress pipeline through the particular egress link to the network node;

forwarding BFD packets received from the network node to the first egress pipeline;

resetting the value of the BFD counter at the first egress pipeline after each BFD packet from the network node is received at the first egress pipeline; and marking the particular egress link as failed when the value of the BFD counter in the first egress pipeline exceeds a predetermined threshold.

2. The method of claim 1 further comprising:
starting a timer after each pair of packets are generated by the packet generator in the first ingress pipeline; and
sending a triggering signal to the packet generator at an expiration of the timer,
wherein the packet generator generates a pair of packets after receiving the triggering signal.

3. The method of claim 1 further comprising:
starting a BFD session after each resetting of the BFD counter; and
placing a BFD session identification in a field in the BFD transmit packet and the BFD dummy transmit packet,
wherein the BFD packets received from the network node comprise a same BFD session identifier in a field of the received packets.

4. The method of claim 3, wherein each ingress pipeline comprises a plurality of match-action stages, each match-action stage configured to determine whether a set of fields in each packet matches a set of values and perform a set of corresponding actions when the set of fields in each packet match the set of values, the method further comprising:
configuring a match-action stage in the first ingress pipeline to match a field in each packet in the first ingress pipeline with said BFD session identification; and
when the field in a packet matches said BFD session identification, setting a first field in the packet to an identification of a source endpoint of the particular egress link and set a second field in the packet to an identification of a destination endpoint of the particular egress link.

5. The method of claim 4 further comprising:
generating a hash value for the second field in the BFD dummy transmit packet; and
forwarding the BFD dummy transmit packet to the first egress pipeline based on the generated hash value.

6. The method of claim 4, wherein the BFD packets received from the network node include the identification of the destination endpoint of the particular egress link in the first field of the packets, the method further comprising:
generating a hash value for the first field in the BFD packets received from the network node; and
forwarding the BFD packets received from the network node to the first egress pipeline based on the generated hash value.

7. The method of claim 1, wherein the BFD packets are received from the network node at a second ingress pipeline different than the first ingress pipeline.

8. The method of claim 1, wherein the first and second egress pipelines are different pipelines.

9. The method of claim 1 further comprising initializing the BFD counter at the first egress pipeline prior to generating the pair of packets to monitor a health of a particular egress link.

10. The method of claim 1, wherein each ingress pipeline comprises a plurality of match-action stages, each match-action stage configured to determine whether a set of fields in each packet matches a set of values and perform a set of corresponding actions when the set of fields in each packet match the set of values, wherein marking the particular egress link as failed comprises:
recirculating the BFD dummy transmit packet to the first ingress pipeline, the recirculating packet causing a match-action stage in the first ingress pipeline to change a status of the particular egress link to failed.

* * * * *